(12) United States Patent
Chikyu et al.

(10) Patent No.: US 12,126,936 B2
(45) Date of Patent: Oct. 22, 2024

(54) INFORMATION PROCESSING APPARATUS AND COMPUTER READABLE MEDIUM

(71) Applicant: FUJIFILM Business Innovation Corp., Tokyo (JP)

(72) Inventors: Masafumi Chikyu, Yokohama (JP); Takashi Hashizume, Yokohama (JP); Xinyu Peng, Yokohama (JP); Shuhei Kawashima, Yokohama (JP); Yoshihiro Kudo, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 404 days.

(21) Appl. No.: 17/405,757

(22) Filed: Aug. 18, 2021

(65) Prior Publication Data
US 2022/0256117 A1  Aug. 11, 2022

(30) Foreign Application Priority Data
Feb. 9, 2021  (JP) .................................. 2021-019154

(51) Int. Cl.
  *H04N 7/15* (2006.01)
  *G06Q 10/067* (2023.01)
  *H04L 65/403* (2022.01)
(52) U.S. Cl.
  CPC ........... *H04N 7/152* (2013.01); *G06Q 10/067* (2013.01); *H04L 65/403* (2013.01)
(58) Field of Classification Search
  CPC .............................. H04N 7/152; H04L 65/403
  See application file for complete search history.

(56) References Cited

U.S. PATENT DOCUMENTS

| | | | |
|---|---|---|---|
| 5,960,173 A | 9/1999 | Tang et al. | |
| 8,040,369 B1 | 10/2011 | Gargan et al. | |
| 8,140,980 B2 | 3/2012 | Gunasekar et al. | |
| 10,999,227 B1 * | 5/2021 | Yan | H04L 51/046 |
| 2007/0188596 A1 * | 8/2007 | Kenoyer | H04N 7/152 |
| | | | 348/E7.084 |
| 2020/0301647 A1 * | 9/2020 | Yoshida | H04L 65/403 |

FOREIGN PATENT DOCUMENTS

| | | |
|---|---|---|
| JP | 2002-163401 A | 6/2002 |
| JP | 2009-064371 A | 3/2009 |
| JP | 2010-141770 A | 6/2010 |
| WO | 2013/123892 A1 | 8/2013 |

OTHER PUBLICATIONS

Feb. 25, 2022 extended Search Report issued in European Patent Application No. 21195235.3.
Apr. 25, 2024 Office Action issued in European Patent Application No. 21195235.3.

* cited by examiner

*Primary Examiner* — Amal S Zenati
(74) *Attorney, Agent, or Firm* — Oliff PLC

(57) ABSTRACT

An information processing apparatus including a processor configured to: allow, in relation to a conference via a communication line in which plural participants participate, plural business card images to be displayable on a terminal of a participant among the plural participants, the plural business card image being images that are obtained by reading business cards of the plural participants including at least one other participant.

9 Claims, 29 Drawing Sheets

FIG. 7

| 705 | 710 | 715 | 720 | 725 | 730 |
|---|---|---|---|---|---|
| CONFERENCE ID | START DATE AND TIME | CONFERENCE TIME | USER ID | USER PASSWORD | URL |
| | | | | | |

FIG. 20

| GROUP ID | USER NUMBER | USER ID |
|---|---|---|
|  |  |  |

2005 — GROUP ID
2010 — USER NUMBER
2015 — USER ID
2000

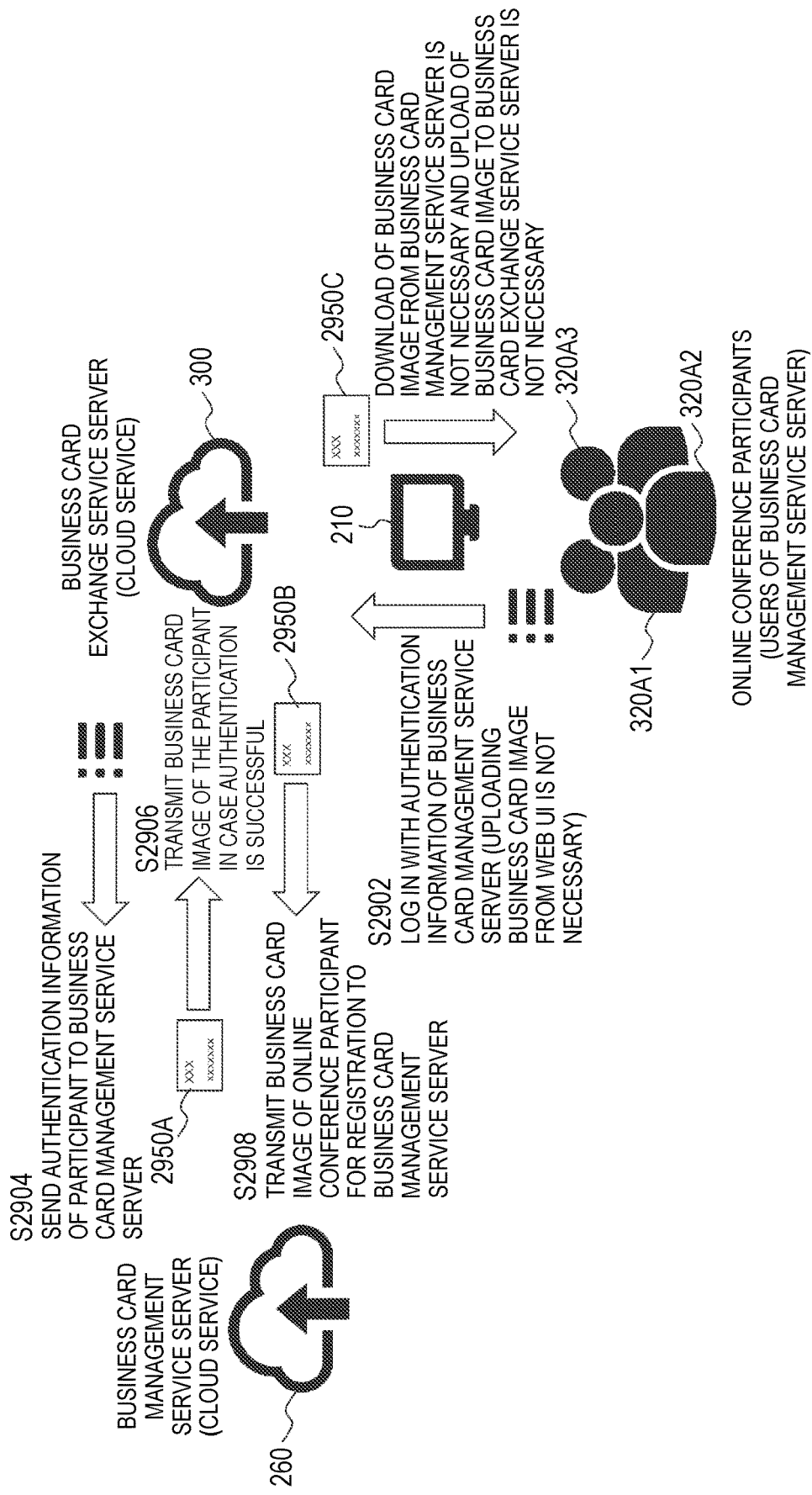

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2021-019154 filed on Feb. 9, 2021.

BACKGROUND

Technical Field

The present disclosure relates to an information processing apparatus and a computer readable medium storing an information processing program.

Related Art

JP-A-2010-141770 is to enable acquisition of business card information equivalent to normal business card exchange in a video conference, and discloses a server device capable of communicating with plural video conference terminal devices that are connected via a network and installed at respective bases. The server device includes: a participant information acquisition unit for acquiring business card information of a participant at each base participating in the conference using the video conference terminal device; a position information acquisition unit for acquiring, from the video conference terminal device at each base, information relating to a position of the participant on a captured image that is captured by the video conference terminal device at said each base and displayed by the video conference terminal device at the other bases that are conference partners; and a printing information processing unit for, for each base, associating business card information of the participants at the other bases with the positions of the participants, generating printing information for printing by a printing device connected to the video conference terminal device at said each base, and transmitting the generated print information to the video conference terminal device at each base.

JP-A-2002-163401 is to obtain a digital business card exchange system capable of exchanging a digital business card without being limited by a time and a place, and capable of taking out information on an exchange digital business card at any time, and discloses a digital business card exchange system including: a unit for registering a personal digital business card on a web site from a user terminal via the Internet; a unit for performing digital business card exchange with another user terminal together with messages of each other; and unit for managing exchange history data.

JP-A-2009-064371 is to provide a business card information providing system capable of easily managing business card information regardless of a difference in OS between a mobile phone and a personal computer, and discloses a business card information providing system in which a mobile phone incorporating a unit for reading a two-dimensional code printed on a business card and a server having a database are connected to each other in a communicable manner via a communication network, and the server transmits URL information on a distribution side web page associated with the two-dimensional code. The database stores user registration data in which a machine number unique to the mobile phone and a PC mail address for personal computer of a user are associated with each other, and business card specifying data for specifying the business card. The business card information providing system extracts the URL information on the distribution side web page and the PC mail address from the database, and transmits the URL information on the distribution side web page to the PC mail address by mail.

SUMMARY

When a conference is held via a communication line with three or more participants, if participants exchange business card images on a one-to-one basis, it is necessary to perform exchange the business card images plural times.

Aspects of non-limiting embodiments of the present disclosure relate to an information processing apparatus and a computer readable medium storing an information processing program that are capable of reducing an operation of business card image exchange as compared with a case of exchanging business card images on a one-to-one basis when a conference with plural participants is performed via a communication line.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: allow, in relation to a conference via a communication line in which plural participants participate, plural business card images to be displayable on a terminal of a participant among the plural participants, the plural business card image being images that are obtained by reading business cards of the plural participants including at least one other participant.

BRIEF DESCRIPTION OF THE DRAWINGS

Exemplary embodiment(s) of the present invention will be described in detail based on the following figures, wherein:

FIG. 7 is an explanatory diagram illustrating an example of a data structure of a reservation information table;

FIG. 20 is an explanatory diagram illustrating an example of a data structure of a group management table;

FIG. 29 is an explanatory diagram illustrating a process example in a case where a business card exchange service server and a business card management service server according to the present exemplary embodiment cooperate with each other.

DETAILED DESCRIPTION

Hereinafter, an exemplary embodiment for realizing the present disclosure will be described with reference to the drawings.

Figure 1:
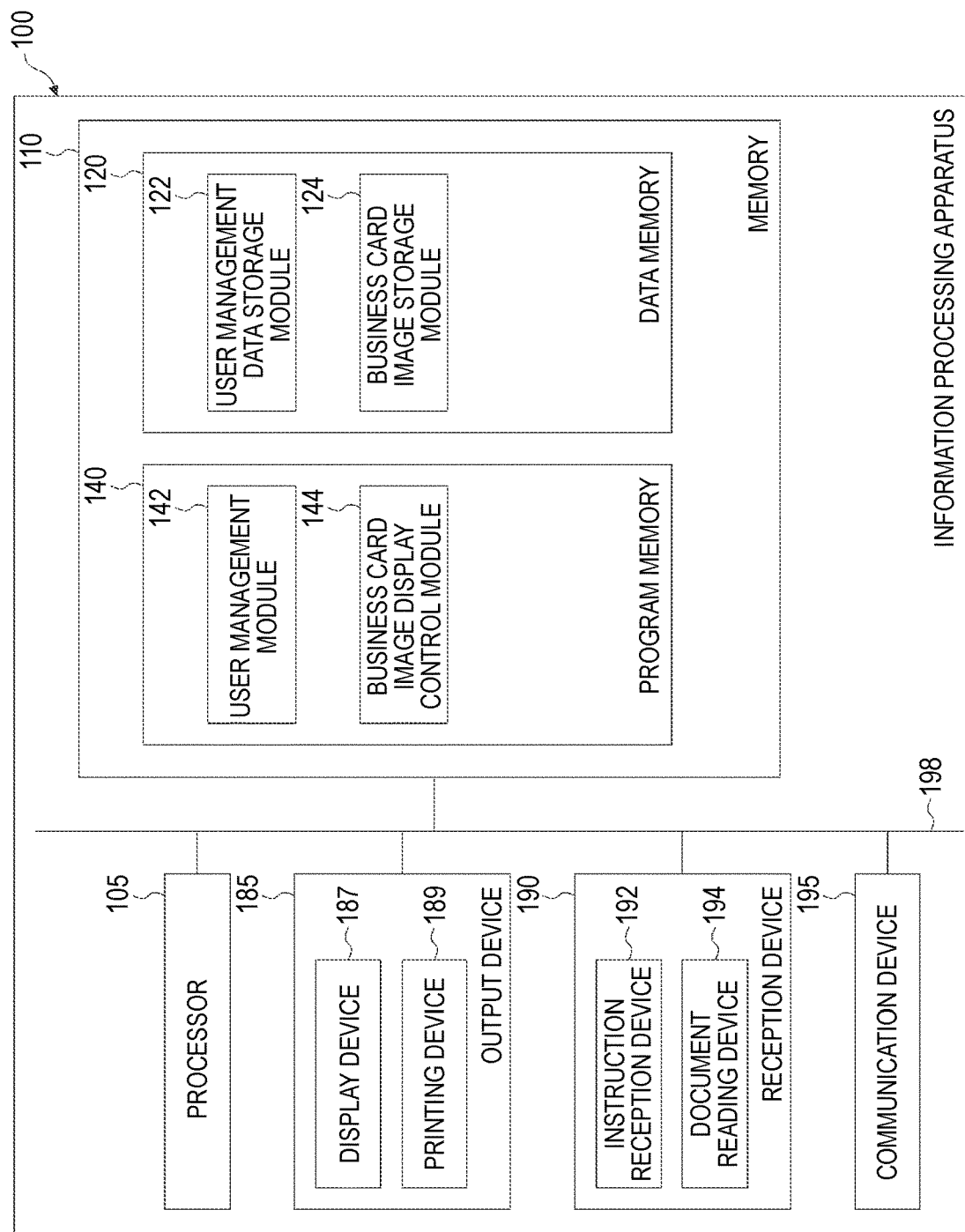
FIG. 1 is a conceptual module configuration diagram illustrating a configuration example according to the present exemplary embodiment.

FIG. 1 illustrates a conceptual module configuration diagram for a configuration example according to the present exemplary embodiment.

The term "module" generally refers to a logically separable component such as software (including a computer program as an interpretation of "software"), hardware, or the like. Therefore, the module in the present exemplary embodiment refers to not only a module in a computer program but also a module in a hardware configuration. Therefore, the exemplary embodiment also serves as a description of a computer program (for example, a program for causing a computer to execute each procedure, a program for causing a computer to function as each unit, a program for causing a computer to realize each function), a system, and a method for functioning these modules. However, although terms "store" and "stored" and equivalents thereof are used for the sake of convenience of description, these terms mean that being stored in a storage device or controlled to be stored in a storage device when the exemplary embodiment is a computer program. In implementation, modules may have a one-to-one correspondence with functions, in the implementation, one module may be configured by one program, plural modules may be configured by one program, and conversely, one module may be configured by plural programs. Plural modules may be executed by one computer, or one module may be executed by plural computers in a distributed or parallel environment. One module may include another module. Hereinafter, the term "connection" is used not only for physical connection but also for logical connections (for example, transmission and reception of data, instruction, reference relationship between data, login, or the like). The term "predetermined" means determined prior to target processing, and includes a meaning of being determined according to a situation or state at that time or according to the situation or state up to that time even after the process according to the present exemplary embodiment starts, as a matter of course, before the process according to the exemplary embodiment starts. When there are plural "predetermined values", the values may be different from each other, or two or more values ("two or more values" may include, of course, all values) may be the same. In addition, a description of "when A, do B" is used in a meaning of "determine whether it is A, do B when it is determined to be A". However, a case where it is not necessary to determine whether it is A is excluded. In addition, when a thing is listed such as "A, B, and C", "A, B, and C" are only examples unless otherwise specified, and include a case where only one of them is selected (for example, only A).

In addition, the system or the apparatus may be configured such that plural computers, hardware, apparatuses, and the like are connected by a communication unit such as a network ("network" including a one-to-one communication connection), or may be realized by a single computer, hardware, an apparatus, or the like. The terms "apparatus" and "system" are used as terms having the same meaning. Of course, the "system" does not include anything that is nothing more than a social "mechanism" (that is, a social system) that is an artificial agreement.

In addition, target information is read from the storage device for each processing by each module or for each processing when plural processing is performed in the module, and after the process is performed, a processing result is written to the storage device. Therefore, description of the reading from the storage device before the process and the writing to the storage device after the process may be omitted.

An information processing apparatus 100 according to the present exemplary embodiment has a function of exchanging business card images in a conference via a communication line between participants of the conference (hereinafter, also referred to as a business card exchange service). As illustrated in an example of FIG. 1, the information processing apparatus 100 includes at least a processor 105 and a memory 110, and is configured by a bus 198 for connecting the processor and the memory and exchanging data. In addition, the information processing apparatus 100 may include an output device 185, a reception device 190, and a communication device 195. Data is exchanged between the processor 105, the memory 110, the output device 185, the reception device 190, and the communication device 195 via the bus 198.

Note that a block diagram illustrated in the example of FIG. 1 also illustrates a configuration example of a hardware configuration of a computer that realizes the present exemplary embodiment. The hardware configuration of the computer in which the program according to the exemplary embodiment is executed is a computer as illustrated in FIG. 1, and specifically, may be used as a personal computer or a server. As a specific example, a processor 105 is used as a processing unit, and a memory 110 is used as a storage device.

The number of the processor 105 may be one or more. The processor 105 includes, for example, a central processing unit (CPU), a microprocessor, or the like. When plural processors 105 are used, either a tightly coupled multiprocessor or a loosely coupled multiprocessor may be used. For example, plural processor cores may be mounted in one processor 105. Further, it is also possible to use a system in which plural computers are virtually caused to behave as a single computer by connecting the plural computers through a communication path. As a specific example, a loosely coupled multiprocessor may be configured as a cluster system or a computer cluster. The processor 105 executes a program in a program memory 140.

The memory 110 may include, for example, a semiconductor memory in the processor 105 such as a register or a cache memory, may be a main memory that is a main storage device including a random access memory (RAM) and a read only memory (ROM), or the like, an internal storage device such as a hard disk drive (HDD) or a solid state drive (SSD) having a function as a permanent storage device, an external storage device or an auxiliary storage device such as a CD, a DVD, a Blu-ray (registered trademark) Disc, a USB memory, or a memory card, or may include a storage device such as a server connected via a communication line.

The memory 110 mainly includes a data memory 120 for storing data and a program memory 140 for mainly storing programs. Incidentally, the data memory 120 and the program memory 140 may store a program such as an OS for starting the computer, data such as a parameter appropriately changed in execution of the module, or the like, in addition to the information shown and the module program.

The output device 185 includes, for example, a display device 187, a printing device 189, or the like. The display device 187 such as a liquid crystal display, an organic EL display, a three-dimensional display, or a projector displays a processing result by the processor 105, data in the data memory 120, or the like as text, image information, or the like. The printing device 189, such as a printer or a multifunction device, prints the processing result by the processor 105, the data in the data memory 120, or the like. The output device 185 may include a speaker, an actuator for vibrating the device, or the like.

The reception device 190 includes, for example, an instruction reception device 192, a document reading device 194, or the like. The instruction reception device 192 such as a keyboard, a mouse, a microphone, or a camera (including a line-of-sight detection camera or the like) receives data based on an operation (including an operation, a voice, a line of sight, or the like) of a user with respect to the keyboard, the mouse, the microphone, the camera (including the line-of-sight detection camera or the like).

Further, a touch screen may be provided with both functions of the display device 187 and the instruction reception device 192. In this case, with respect to realization of a function of the keyboard, even when there is no physical key, a keyboard image (also called a software keyboard, a screen keyboard, or the like) may be drawn on the touch screen by software so as to realize the function of the keyboard.

The display device 187 and the instruction reception device 192 are mainly used as a user interface.

The document reading device 194 such as a scanner or a camera reads or captures a document and receives the generated image data.

The communication device 195 is a communication line interface such as a network card for connecting to other devices via a communication line. The other devices include a terminal 210, which is a terminal of a participant to be described later using the example of FIG. 2, an online conference service server 240, a storage DB service server 250, a business card management service server 260, and the like.

In the exemplary embodiment, for a computer program, the computer program that is software is read into the program memory 140 of the hardware configuration, and software and the hardware resources cooperate with each other to realize the exemplary embodiment. That is, the present exemplary embodiment is specifically realized by using hardware resources (including at least the processor 105, the memory 110, and in some cases the output device 185, the reception device 190, and the communication device 195) by the information processing by software, and the law of nature is used as a whole.

Note that the hardware configuration illustrated in FIG. 1 illustrates one configuration example, and the present exemplary embodiment is not limited to the configuration illustrated in FIG. 1, but may be any configuration as long as the module described in the present exemplary embodiment is executable. For example, as the processor 105, a GPU (abbreviation of Graphics Processing Unit, including GPGPU (abbreviation of General-Purpose Graphics Processing Units)) may be used, some of the modules may be executed by dedicated hardware (for example, an integrated circuit for a specific application (as a specific example, an ASIC (abbreviation of Application Specific Integrated Circuit) or the like) or a reconfigurable integrated circuit (as a specific example, an FPGA (abbreviation of Field-Programmable Gate Array) or the like), some modules may be in an external system and connected by a communication line, further, plural systems illustrated in FIG. 1 may be connected to each other by a communication line so as to cooperate with each other. In addition, particularly, in addition to a personal computer, the hardware may be incorporated into a portable information communication device (including a portable phone, a smartphone, a mobile device, a wearable computer, or the like), an information appliance, a robot, a copier, a fax machine, a scanner, a printer, a multifunction device (an image processing apparatus having two or more functions of a scanner, a printer, a copier, a fax machine, or the like), or the like.

The processor 105 is connected to the memory 110, the output device 185, the reception device 190, and the communication device 195 via the bus 198. The processor 105 executes processing according to a computer program describing an execution sequence of each module, which is a program in the program memory 140. For example, when an operation of the user is received by the instruction reception device 192, processing by a module corresponding to the operation in the program memory 140 is executed, the processing result is stored in the data memory 120, output to the display device 187, or transmitted to another device by controlling the communication device 195.

The memory 110 includes the data memory 120 and the program memory 140, and is connected to the processor 105, the output device 185, the reception device 190, and the communication device 195 via the bus 198.

The data memory 120 stores a user management data storage module 122 and a business card image storage module 124.

The user management data storage module 122 stores data for managing users using the information processing apparatus 100. Specifically, a reservation information table 700 illustrated in an example of FIG. 7 to be described later, a session token management table 1000 illustrated in an example of FIG. 10, a group management table 2000 illustrated in an example of FIG. 20, and the like are stored.

The business card image storage module 124 stores business card images per se and data for managing the business card images. Here, a business card image is an image obtained by reading a business card of a user. Each business card image stored in the business card image storage module 124 is associated with a user ID, and the business card image is able to be extracted from the user ID. Conversely, the user ID is able to be extracted from the business card image. In the latter case, by calculating a degree of similarity between the business card image as the search target and the business card images in the business card image storage module 124, it is possible to search the business card image and extract the user ID. In addition to the business card image, information for setting whether to display the business card image, specifically, a business card image display setting table 2200 shown in an example of FIG. 22, a business card image display setting table 2400 shown in an example of FIG. 24, a business card image display/hide management table 2600 shown in an example of FIG. 26, a business card image display/hide management table 2800 shown in an example of FIG. 28, or the like, which will be described later, are stored.

The program memory 140 stores a user management module 142 and a business card image display control module 144.

The user management module 142 manages users using the information processing apparatus 100. Here, the users are also users participating in the conference. Specifically, groups to which the users belong are extracted, or it is determined whether the users belong to the same group. A group includes one or more participants, and is, for example, a group in which business card exchange is not necessary.

The business card image display control module 144 controls display with respect to the terminals of participants via the communication device 195 and the communication line.

The business card image display control module 144 performs control such that when a conference involving plural participants is performed via the communication line, plural business card images of the participants are displayable on terminals of the other participants.

Here, the "conference via the communication line" is a conference that is held by capturing each participant (mainly a face of each participant) with a camera on a terminal owned by each person or a terminal used by plural participants, converting a speech of each participant into an audio signal by a microphone, distributing the photographed image and the audio signal to a terminal of each participant, displaying the received image, and outputting the audio signal as a sound by a speaker, and includes an online conference, a web conference, a video conference, a video chat, or the like. The communication line may be a dedicated line, a general-purpose line, or may be, for example, an intranet or the Internet. The terminal may be a dedicated device, or may be a general-purpose device such as a personal computer or a mobile terminal.

In addition, the "conference" in the present exemplary embodiment includes not only "collection for the purpose of consultation and discussion", but also a collection gathering for other purposes, such as "face-to-face events", "fellowships (so-called online drinking parties)", or the like.

The "business card image" is an image obtained by reading a business card of a participant. Specifically, an actual business card (material is not limited, but, for example, a business card made of paper, plastic, or the like) is electronically read by a scanner, a camera, or the like. One business card image corresponds to each participant. Therefore, a case of "business card images of plural participants" involves plural business card images. Plural business card images may also be associated with each participant. This corresponds to a case where a participant has plural business cards.

The expression "perform control such that . . . are displayable" includes, for example, forcibly displaying on the terminal, displaying (or preventing display) in accordance with an instruction of the participant with respect to the terminal, or as described below, displaying images of second participants other than the same group, that is, preventing display of images of first participants belonging to the same group, or the like.

In addition, control may be performed such that a business card image of a participant is displayed on the terminal of the participant (the same person), or is not displayed on the terminal of the participant.

The number of "other participants" may be one or more. Business card images of plural participants are displayed on the other participants (one or plural participants). That is, in online exchange on a one-to-one basis, plural business card images cannot be simultaneously displayed to the company (including exchange), whereas the information processing apparatus 100 of the present exemplary embodiment enables simultaneous display of plural business card images to the company.

The business card image display control module 144 may display all the business card images of the participants of the conference on a terminal of a participant, but may particularly perform the display control as follows.

The business card image display control module 144 may perform control such that business card images of first participants belonging to a group of the participant are not displayed on the terminal of the participant. In a case of belonging to the same group, since names and the like of the first participants are already known, the screen may be widely used without displaying the business card images.

In addition, the business card image display control module 144 may perform control such that only business card images of second participants not belonging to the group of the participant are displayed on the terminal of the participant.

Further, the business card image display control module 144 may perform control such that business card images of first participants belonging to the group of the participant are displayed in response to an operation of the participant. As described above, control is performed such that the business card images of the first participants belonging to the group of the participant are not displayed (or only the business card images of the second participants not belonging to the group of the participant are displayed on the terminal of the participant). However, since a new employee or the like does not necessarily known the names or the like of the first participants even in the same group, the business card images of the first participants of the same group are displayed upon operation of the participant. Examples of the operation of the participant include selection of a "display business card images" button.

Then, the business card image display control module 144 may perform control such that in response to a deletion operation by the participant, the business card images of the first participants belonging to the group of the participant are deleted from a screen and business card images of second participants not belonging to the group of the participant are not deleted.

The business card image display control module 144 may perform control such that when business card images of first participants belonging to a group of a participant (A) and business card images of second participants (C) not belonging to the group of the participant (A) are displayed, the business card images of the first participants (B) belonging to the group of the participant (A) and the business card images of the second participants (C) not belonging to the group of the participant (A) are displayed in a manner distinguished from each other. As described above, there is a possibility that all the business card images of the participants of the conference are displayed, or that the business card images of the second participants (C) not belonging to the group of the participant (A) are displayed, and the business card images of the first participants (B) belonging to the group of the participant (A) are further displayed in accordance with the operation of the participant (A). In such a case, the participant (A) may determine whether a participant is a participant of the same group by viewing the business card images.

Further, the business card image display control module 144 may perform control such that when a URL (abbreviation of Uniform Resource Locator) for displaying the business card images is accessed from the terminal of the participant, a business card image already stored in the URL is displayed on the terminal.

Further, the business card image display control module 144 may perform control such that when the business card image is stored into the URL from the terminal of the participant, the business card image is displayed on the terminals of the other participants.

Further, the business card image display control module 144 may generate the same URL, the same participant ID, and the same password for a group including plural participants before starting the conference.

A person who instructs the generation thereof may be any person, and may be, for example, an organizer of the conference. Then, the organizer acquires a set of the generated URL, participant ID, and password, and transmits the set to the participants of the conference. The participants access the URL, and log into the business card exchange service in the information processing apparatus 100 using the participant ID and the password.

Then, the business card image display control module 144 may perform control such that a business card image stored by a participant of the same participant ID is not displayed on the terminals of the participants belonging to the group of the participant.

Further, the business card image display control module 144 may generate the same URL, the same participant ID, and the same password for a group including plural participants before starting the conference.

Then, the business card image display control module 144 may perform control such that only a business card image stored by a participant of a different participant ID is displayed on the terminals of the participants not belonging to the group of the participant.

The business card image display control module 144 may perform control in cooperation with a business card management service so as to acquire a business card image of the participant from the business card management service, and to enable display of the business card image on the terminals of the other participants. In the above-described business card image display control module 144, the participant registered his/her business card image in the information processing apparatus 100, but by cooperating with the business card management service so as to acquire the business card image from the business card management service, it is not necessary to perform the registration operation of the business card image by the user with respect to the information processing apparatus 100.

In the case in cooperation with the business card management service, the business card image display control module 144 may, when a business card image is stored from a terminal of another participant, register the business card image of the participant in the business card management service. In the above-described business card image display control module 144, the participant registered the business card images of the other participants in the business card management service, but by cooperating with the business card management service so as to acquire the business card images of the other participants from the business card management service, it is not necessary to perform the registration operation of the business card images of the other participants by the user with respect the business card management service.

The cooperation processing with the business card management service will be described later with reference to an example of FIG. 29.

Figure 2:
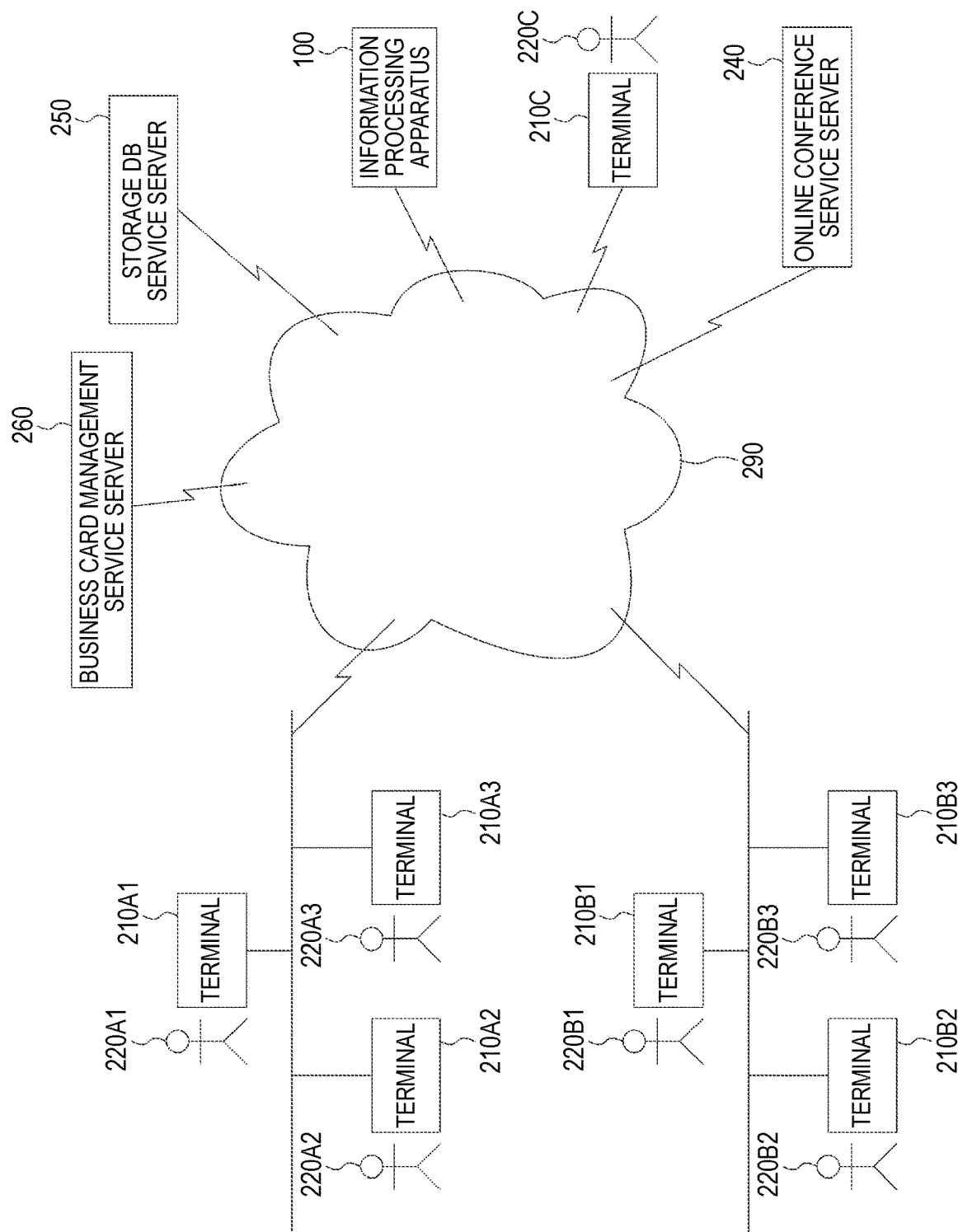
FIG. 2 is an explanatory diagram illustrating a system configuration example using the present exemplary embodiment.

FIG. 2 is an explanatory diagram illustrating a system configuration example using the present exemplary embodiment.

The information processing apparatus 100, a terminal 210A1, a terminal 210A2, a terminal 210A3, a terminal 210B1, a terminal 210B2, a terminal 210B3, a terminal 210C, an online conference service server 240, a storage DB service server 250, and a business card management service server 260 are connected to each other via a communication line 290. The communication line 290, the communication line connecting the terminal 210A1, the terminal 210A2, and the terminal 210A3, the communication line connecting the terminal 210B1, the terminal 210B2, and the terminal 210B3 may be wireless, wired, or a combination thereof, and may be, for example, the Internet, an intranet, or the like as a communication infrastructure. The functions of the information processing apparatus 100, the online conference service server 240, the storage DB service server 250, and the business card management service server 260 may be realized as a cloud service.

A user 220 (user 220A1, user 220B1, user 220C, or the like) that may be the participant of the conference has the terminal 210 (terminal 210A1, terminal 210B1, terminal 210C, or the like). The terminal 210 has a communication function, and includes a display device, a microphone, a camera, and a speaker (including an earphone and a headphone) for holding a conference. For example, a personal computer (including a notebook computer), a mobile information communication device, or the like is applicable.

As described above, the information processing apparatus 100 has the function of the business card exchange service.

The online conference service server 240 has a function of performing a process for realizing a conference via a communication line.

The storage DB service server 250 is used by the information processing apparatus 100, the online conference service server 240, the business card management service server 260, or the like, stores data, and functions as a database.

The business card management service server 260 has a function of a business card management service, and manages information related to a business card of each user 220. Here, the business card includes a business card of the user 220 itself and a business card received by the user 220. Examples of the information related to the business card include information described in a business card (name, company name, affiliation organization, or the like, position name, address, telephone number, mail address, or the like), date and time at which the business card is received, a business card image, or the like. The information related to the business card may be shared by a group member (user 220) belonging to the same group in addition to being used by the user 220 who has registered the information related to the business card in the business card management service server 260.

The online conference service server 240, the storage DB service server 250, the business card management service server 260, and the information processing apparatus 100 may provide independent services, may provide services in cooperation with each other, or may combine two or more servers to provide plural functions thereof as one service. For example, the information processing apparatus 100 may provide a function as a web service independent of the online conference service server 240, the information processing apparatus 100 may provide a service in cooperation with the business card management service server 260, or the function of the information processing apparatus 100 may be incorporated into the online conference service server 240 as one function of the conference service to allow a business card image exchange.

When the information processing apparatus 100 independently provides a service, the participant of the conference does not need to be the user of the same business card management service. That is, the participant of the conference may be a user of a different business card management service, or may not use the business card management service itself.

The present exemplary embodiment (information processing apparatus 100) performs the following process, for example.

The business card exchange service provided by the information processing apparatus 100 issues a URL for accessing a web UI for exchanging the business cards, and opens the web UI for exchanging the business cards from the URL at the time of the conference by the online conference service server 240 to allow business card exchange during the conference.

The web UI can freely change the arrangement of the displayed business cards. Therefore, even in the information processing apparatus 100 independent of the conference, business cards may be arranged according to the display order of the conference participants.

The business cards exchanged by the users of the business card management service server 260 cooperating with the information processing apparatus 100 that performs the business card exchange service are automatically registered in the business card management service server 260, and a non-user person is allowed to download the business card images. Therefore, both users of the business card management service server 260 and persons other than users of the business card management service server 260 may acquire the business card images.

Figure 3:
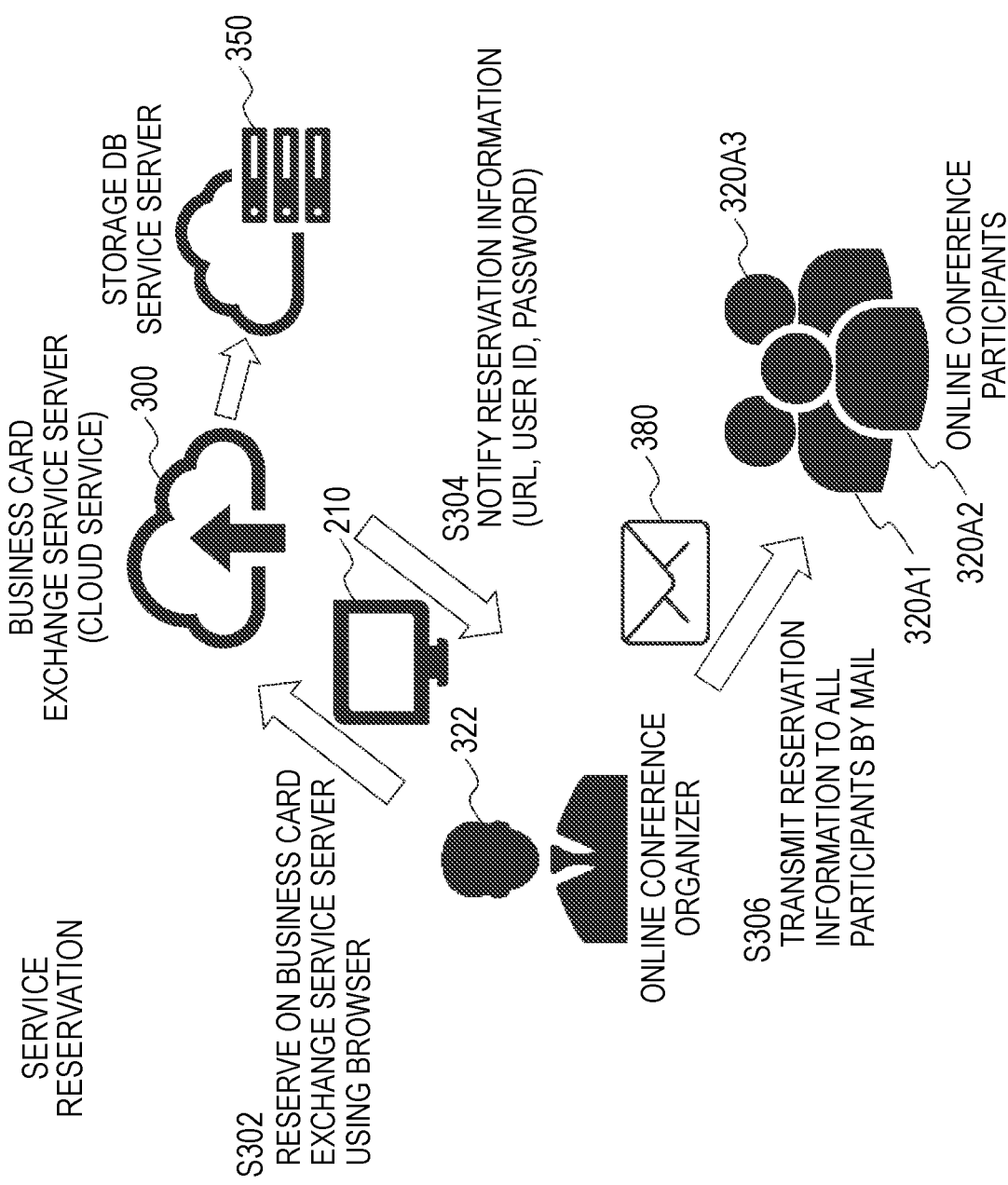
FIG. 3 is an explanatory diagram illustrating a process example related to service reservation according to the present exemplary embodiment.

FIG. 3 is an explanatory diagram illustrating an overview of a process example related to reservation of the business card exchange service according to the present exemplary embodiment.

The business card exchange service server 300 is a specific exemplary embodiment of the information processing apparatus 100, and is realized as a cloud service.

The storage DB service server 350 stores information, business card images, and the like related to reservation of a conference.

In step S302, an online conference organizer 322 reserves the business card exchange service server 300 using a web browser using the terminal 210. The business card exchange service server 300 performs a reservation process of the business card exchange service, and stores information on the reservation in the storage DB service server 350.

In step S304, the business card exchange service server 300 notifies the online conference organizer 322 of the reservation information (URL, user ID, password). Specifically, the reservation information is displayed on the web browser of the terminal 210 of the online conference organizer 322.

In step S306, the online conference organizer 322 uses the terminal 210 to transmit the reservation information to all participants of the conference (in the example of FIG. 3, an online conference participant 320A1, an online conference participant 320A2, and an online conference participant 320A3) by a mail 380.

Although the online conference organizer 322 is required to be a user of the business card exchange service, the participants of the conference (the online conference participant 320A1, the online conference participant 320A2, and the online conference participant 320A3) are not required to be users of the business card exchange service. This is because the participants of the conference may use the business card exchange service by using the reservation information in the mail 380.

The reservation information may distribute the same reservation information to plural participants. In this case, as will be described later, the participants of the same reservation information may be treated as belonging to the same group. The reservation information may be different for each conference in terms of security.

Figure 4:
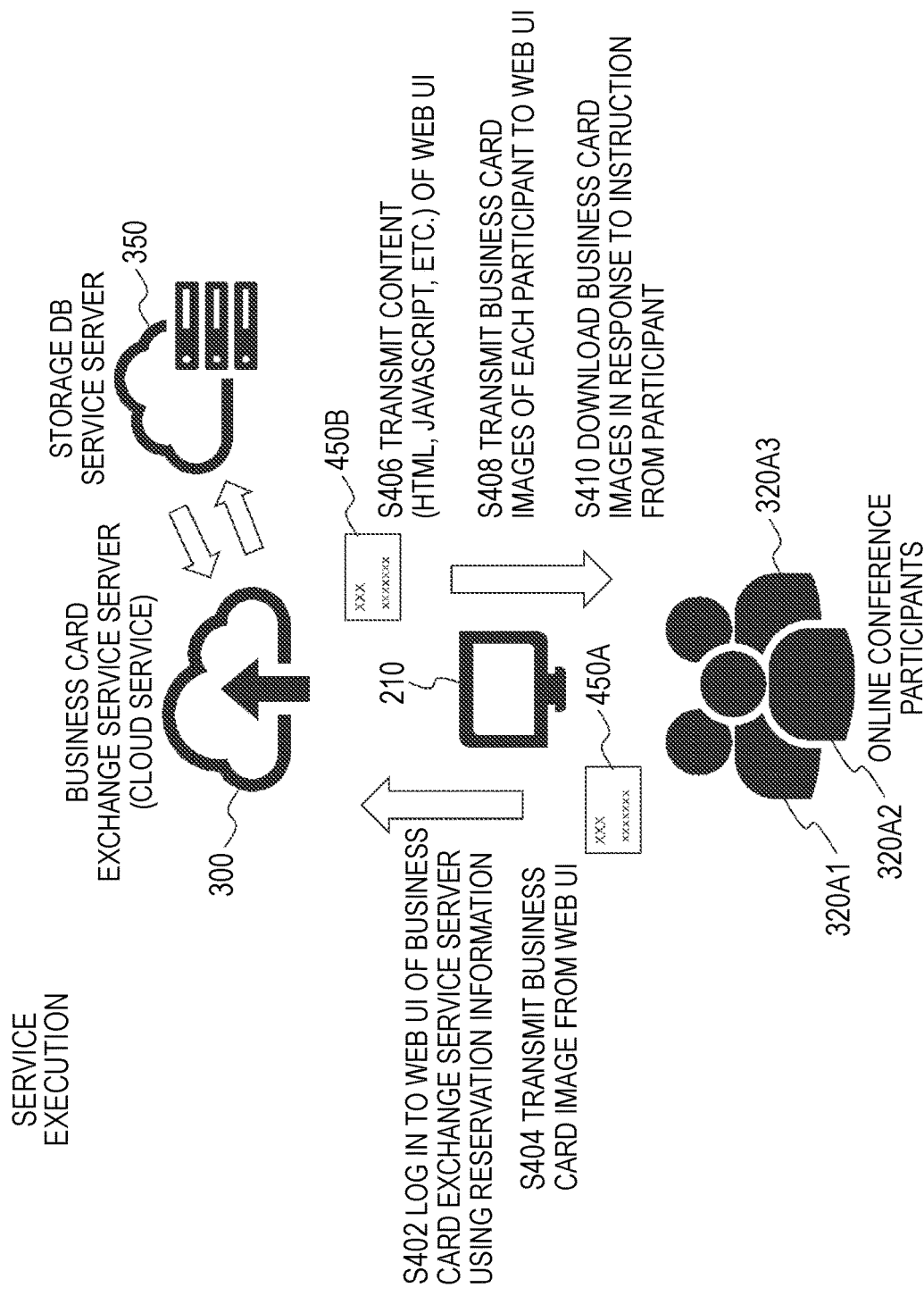
FIG. 4 is an explanatory diagram illustrating a process example related to service reservation according to the present exemplary embodiment.

FIG. 4 is an explanatory diagram illustrating an overview of a process example related to service execution according to the present exemplary embodiment.

The process example is performed after the process illustrated in the example of FIG. 3 is performed. The participants of the conference (the online conference participant 320A1, the online conference participant 320A2, and the online conference participant 320A3) receive the mail 380 and use the process of the business card exchange service.

In step S402, the online conference participant 320A1 and the like log into a web UI of the business card exchange service server 300 using the reservation information in the mail 380 using the terminals 210.

In step S404, the online conference participant 320A1 and the like use the terminals 210 to transmit their own business card images 450A to the business card exchange service server 300 from the web UI.

In step S406, the business card exchange service server 300 transmits a content (HTML, JavaScript, or the like) of the web UI to the terminals 210 of the online conference participant 320A1 and the like.

In step S408, the business card exchange service server 300 transmits business card images 450B of the participants (the online conference participant 320A1 and the like) to the web UI in each terminal 210 of the online conference participant 320A1 and the like. The business card exchange service server 300 stores the business card image 450B in the storage DB service server 350.

In step S410, each terminal 210 downloads the business card images 450B from the business card exchange service server 300 in response to an instruction from the participant (the online conference participant 320A1 or the like). The business card exchange service server 300 extracts the business card images 450B from the storage DB service server 350 and transmits the business card images 450B to each terminal 210.

Since display of the web UI is independent between the users, processing of an operation of changing an order of the business card images may be either completed in each terminal 210 or processed on the side of the business card exchange service server 300.

Figure 5:
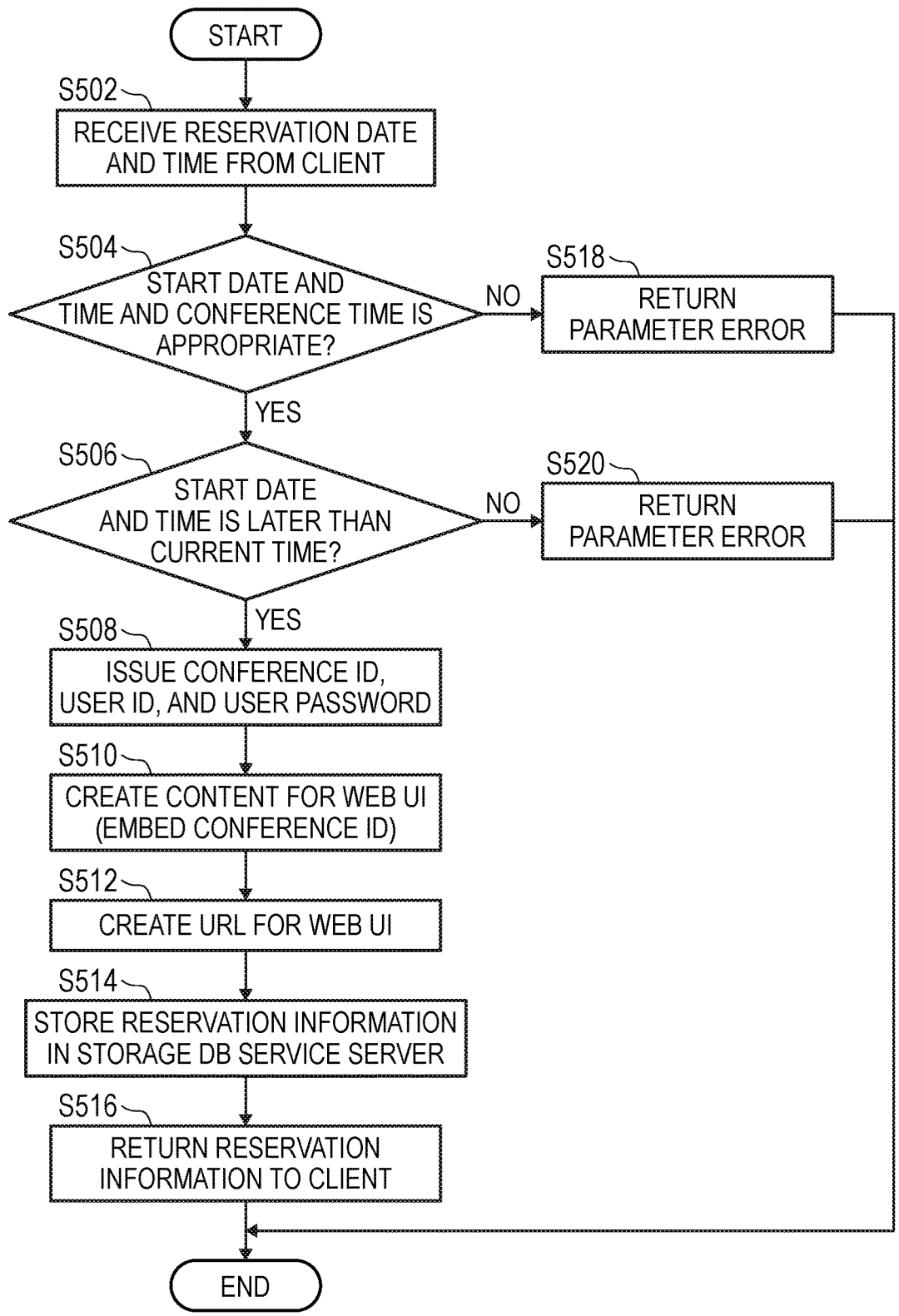
FIG. 5 is a flowchart illustrating a process example according to the present exemplary embodiment.

FIG. 5 is a flowchart illustrating a process example according to the present exemplary embodiment (business card exchange service server 300). FIG. 5 shows a specific example of the process example shown in the example of FIG. 3.

A conference ID is issued uniquely for each conference, and the information in the storage DB service server 350 is taken out using the conference ID as a key. The conference ID is embedded in the content, the URL, or the like, and the user 220 (the online conference participant 320, the online conference organizer 322) does not need to designate the conference ID.

In step S502, a reservation date and time is received from a client. Here, the "client" is the terminal 210 used by the online conference organizer 322.

Figure 6:
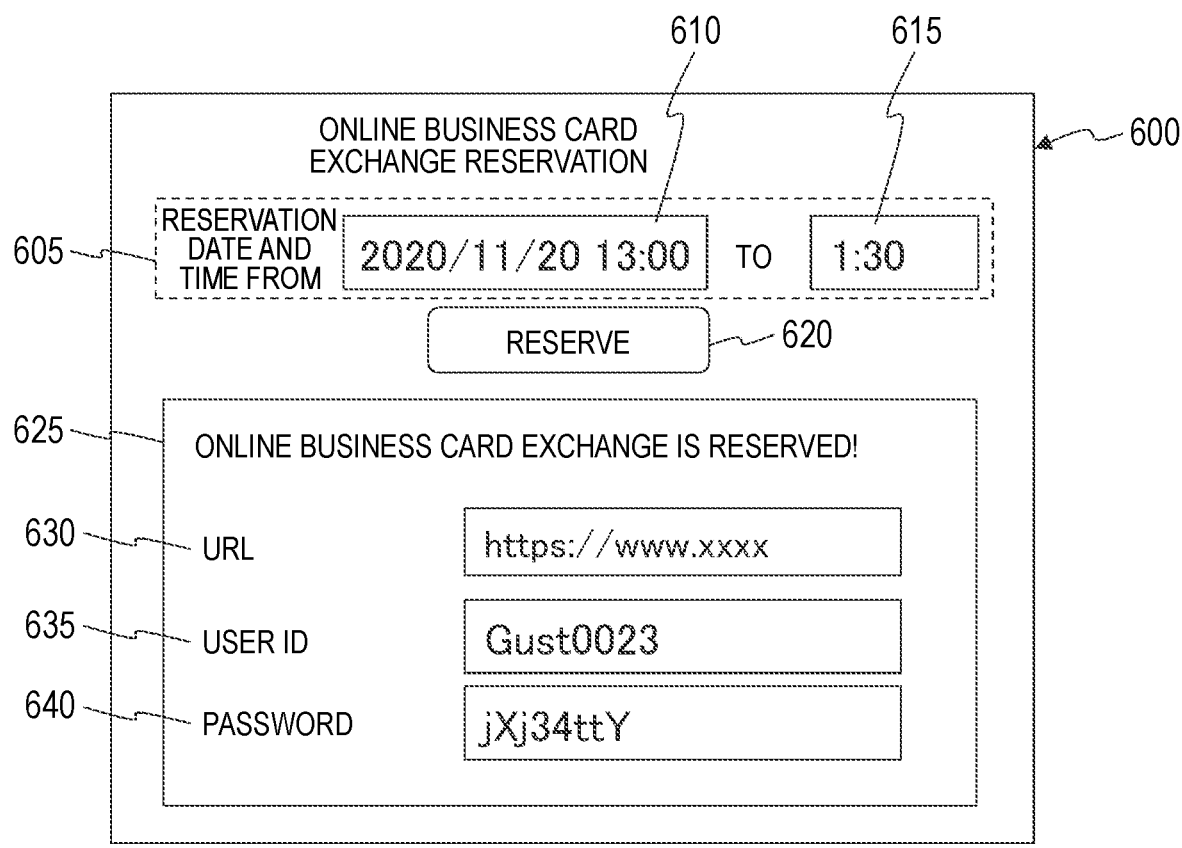
FIG. 6 is an explanatory diagram illustrating a display example according to the present exemplary embodiment.

For example, the business card exchange service server 300 causes the terminal 210 to display the online business card exchange reservation screen 600 as illustrated in the example of FIG. 6.

FIG. 6 is an explanatory diagram illustrating the display example according to the exemplary embodiment.

On the online business card exchange reservation screen 600, a reservation date and time setting region 605, a reservation button 620, and a reservation information display region 625 are displayed.

In the reservation date and time setting region 605, a start date and time column 610 and a conference time column 615 are displayed.

The online business card exchange reservation screen 600 is displayed on the terminal 210 of the online conference organizer 322, and prompts input to the start date and time column 610 and the conference time column 615.

Upon operation of the online conference organizer 322, input to the start date and time column 610 and the conference time column 615 is performed.

For example, "2020/11/20 13:00" is input to the start date and time column 610, and for example, "1:30" is input to the conference time column 615. That is, the conference is started from 2020/11/20, 13:00, and the conference time is scheduled for 1 hour and 30 minutes.

When an input to the start date and time column 610 and the conference time column 615 is performed, the reservation button 620 is selected by the online conference organizer 322. Then, the business card exchange service server 300 displays the inside of the reservation information display region 625.

In the reservation information display region 625, a URL column 630, a user ID column 635, and a password column 640 are displayed.

In the reservation information display region 625, for example, "Online business card exchange reserved!" is displayed. For example, "http://www.xxxx" is displayed in the URL column 630, "Gust0023" is displayed in the user ID column 635, and "jXj34ttY" is displayed in the password column 640.

In the reservation date and time setting region 605, the start date and time column 610 and the conference time column 615 are displayed to prompt input, but a conference start date and time and a conference end date and time may be input as well.

By inputting the time and the period of the conference, the URL for displaying the web UI of the business card exchange service server 300 and the ID and the password for the participants to log into the business card exchange service server 300 at the time are issued. By issuing a dedicated URL each time, it is possible to specify the participants of the same conference, and to prevent unauthorized access by limiting the period.

In step S504, it is determined whether the start date and time and the conference time are appropriate. If appropriate, the process proceeds to step S506. Otherwise, the process proceeds to step S518. Specifically, it is determined whether the start date and time is a holiday, a predetermined time (for example, midnight or the like), whether the conference time is within a predetermined time range (for example, 15 minutes or more and 3 hours or less), or the like.

In a case of inputting the conference start date and time and the conference end date and time, it may be determined whether an order of the start date and time and the end date and time is correct.

In step S506, it is determined whether the start date and time is later than the current time. If later than the current time, the process proceeds to step S508. Otherwise, the process proceeds to step S520.

In step S508, the conference ID, the user ID, and the user password are issued. For example, the conference ID and the user ID may be generated in sequences, and the user password may be generated at random (including a pseudo random number). The conference ID and the user ID may also be generated at random.

For example, the business card exchange service server 300 generates the reservation information table 700 and stores the reservation information table 700 in the storage DB service server 350.

Figure 7:
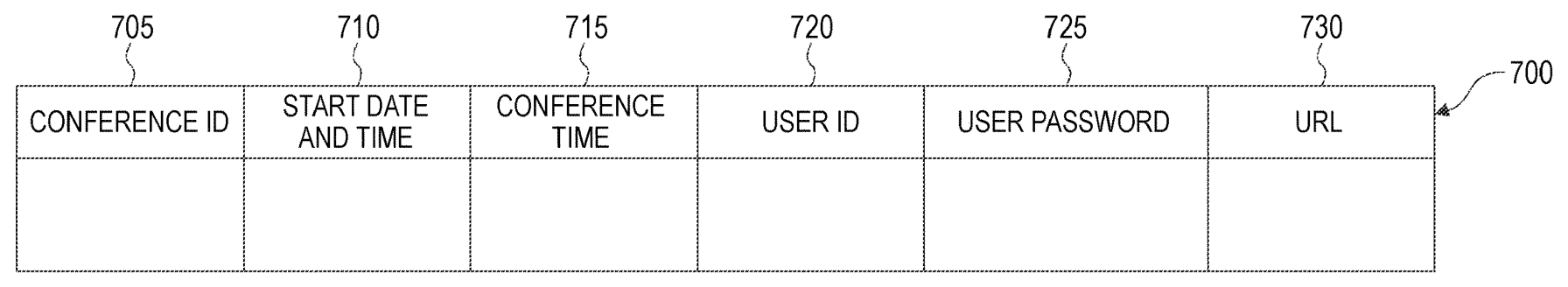

FIG. 7 is an explanatory diagram illustrating an example of the data structure of the reservation information table 700.

The reservation information table 700 includes a conference ID column 705, a start date and time column 710, a conference time column 715, a user ID column 720, a user password column 725, and a URL column 730. In the present exemplary embodiment, the conference ID column 705 stores information for uniquely identifying a conference (specifically, conference ID: abbreviation of conference ID). The start date and time column 710 stores the start date and time of the target conference. The time in the start date and time column 710 is the date and time when the conference is started. Specifically, the time is a value set in the start date and time column 610 of the online business card exchange reservation screen 600 illustrated in the example of FIG. 6. The conference time column 715 stores the conference time of the target conference. The time in the conference time column 715 is a time period from the start to the end of the conference. Specifically, the time is a value set in the conference time column 615 of the online business card exchange reservation screen 600 illustrated in the example of FIG. 6. In the exemplary embodiment, the user ID column 720 stores information (specifically, user ID) for uniquely identifying a user who uses the business card exchange service. The user ID here is not for identifying each conference participant, but is for identifying the user who uses the business card exchange service. Therefore, the user ID here may be allocated to plural persons, and may be allocated, for example, in units of groups. The user password column 725 stores a password used for authentication of the user. The URL column 730 stores a URL for the user to use the business card exchange service. Specifically, the URL is a URL for displaying a business card image.

In step S510, the content for the web UI is created. The conference ID is embedded in the content.

In step S512, the URL for the web UI is created. The URL is stored and managed in the URL column 730 of the above-described reservation information table 700.

In step S514, the reservation information is stored in the storage DB service server 350.

In step S516, the reservation information is responded to the client. Specifically, the information in the reservation information display region 625 of the online business card exchange reservation screen 600 is displayed. After acquiring the reservation information, the online conference organizer 322 notifies the participants of the conference of the reservation information by using the mail 380 or the like.

In step S518, a response is made indicating a parameter error (for example, an error message indicating that the date and time of the conference is not appropriate).

In step S520, a response is made indicating a parameter error (for example, an error message indicating that the conference has already passed).

Figure 8:
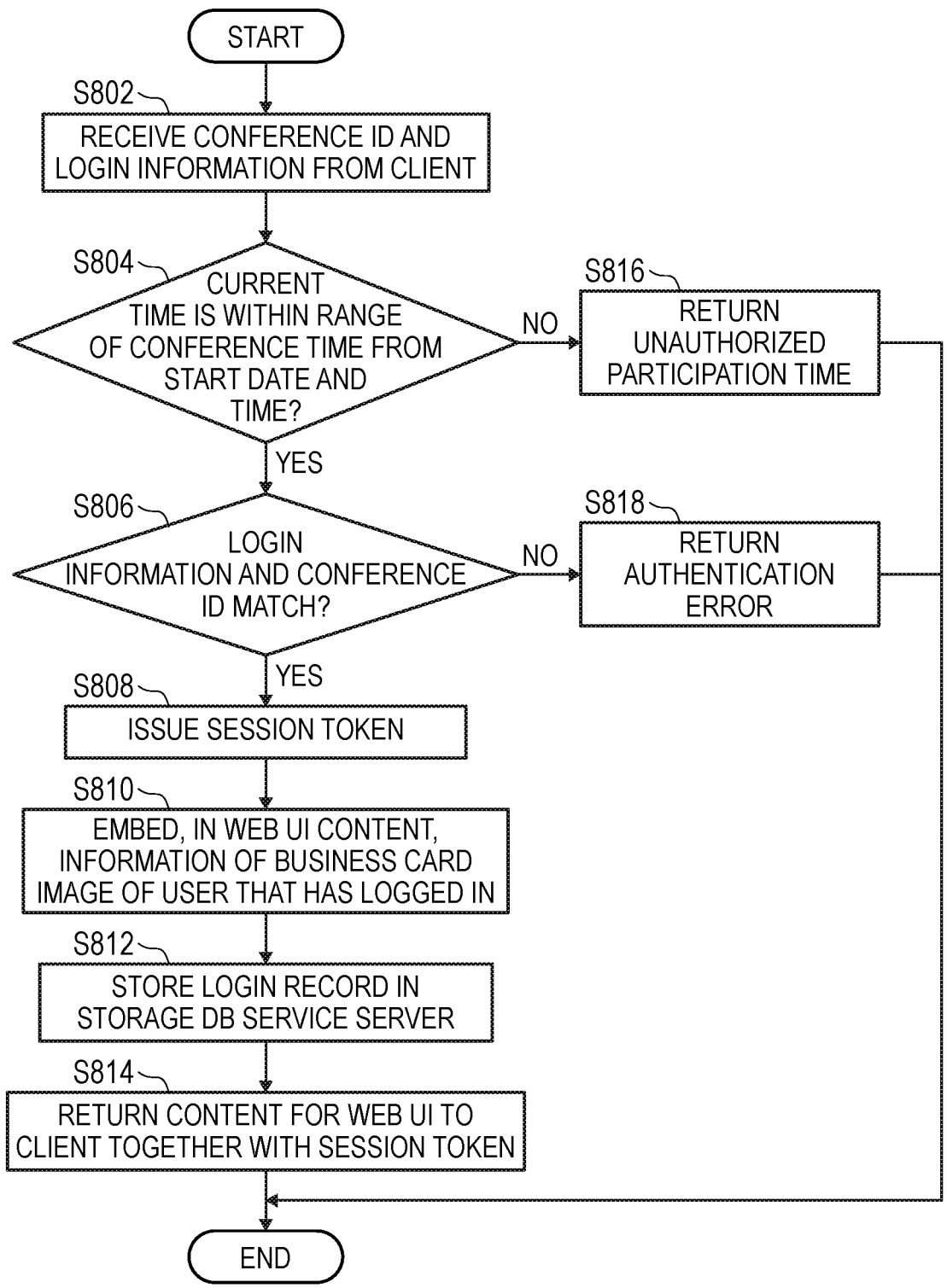
FIG. 8 is a flowchart illustrating a process example according to the present exemplary embodiment.

FIG. 8 is a flowchart illustrating a process example according to the present exemplary embodiment (business card exchange service server 300). FIG. 8 shows a specific example of the process example shown in the example of FIG. 4.

The session token used here is used for identification of the user in the session and management of the uploaded image.

In step S802, the conference ID and the login information are received from the client. Here, the "client" is the terminal 210 used by the online conference participant 320.

Figure 9:
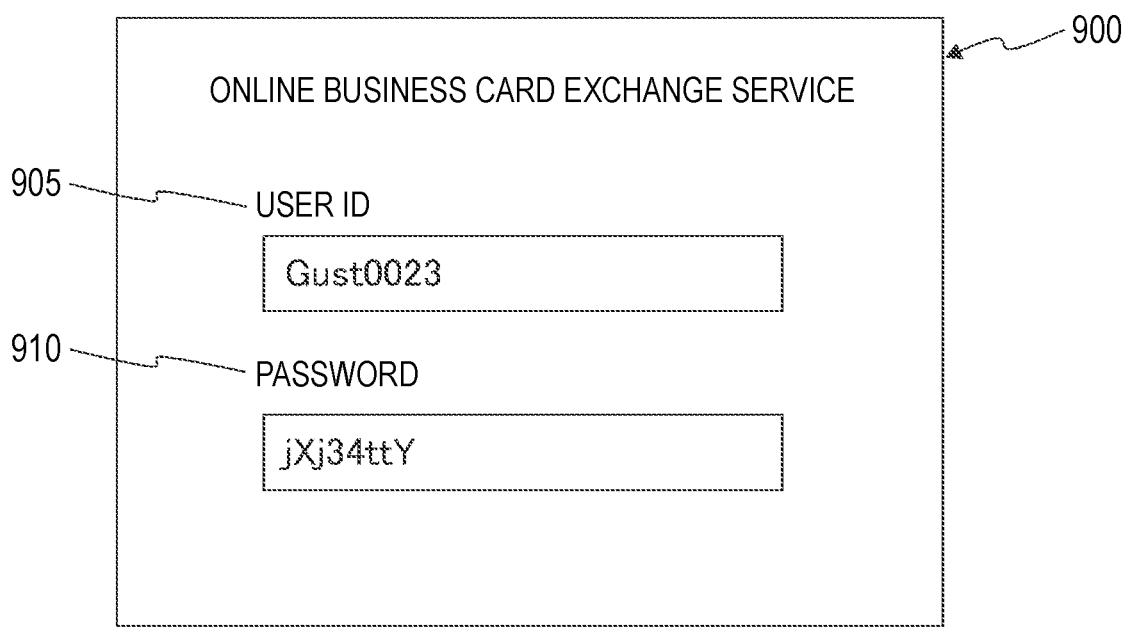
FIG. 9 is an explanatory diagram illustrating a display example according to the present exemplary embodiment.

For example, the business card exchange service server 300 causes the terminal 210 to display the online business card exchange login screen 900 as illustrated in the example of FIG. 9.

FIG. 9 is an explanatory diagram illustrating the display example according to the present exemplary embodiment.

On the online business card exchange login screen 900, a user ID column 905 and a password column 910 are displayed.

The online business card exchange login screen 900 is displayed on the terminal 210 of the online conference participant 320, and prompts input to the user ID column 905 and the password column 910.

Upon operation of the online conference participant 320, an input to the user ID column 905 and the password column 910 is performed.

For example, "Gust0023" is input to the user ID column 905, and "jXj34ttY" is input to the password column 910. These input values (reservation information) are values received by the online conference organizer 322 in step S516 in the flowchart illustrated in the example of FIG. 5, and are notified by the online conference organizer 322 to the online conference participant 320.

When the URL is opened from the web browser, the online business card exchange login screen 900 is displayed, and it is confirmed from the user ID and the password that the person is a user of the business card exchange service. Then, the screen transitions to display of the business card exchange web UI. By displaying the online business card exchange login screen 900, it is possible to prevent unauthorized access to the business card exchange service server 300.

In step S804, it is determined whether the current time is within the range of the conference time from the start date and time. If it is within the range of the conference time from the start date and time, the process proceeds to step S806. Otherwise, the process proceeds to step S816. Specifically, the determination may be performed using the current time and the information in the conference time column 715 of the reservation information table 700.

As described above, when the conference start date and time and the conference end date and time are input to the online business card exchange reservation screen 600, it may be determined whether the current time is within the range of the start date and time and the end date and time.

In step S806, it is determined whether the login information and the conference ID match. If matching, the process proceeds to step S808. Otherwise, the process proceeds to step S818. Specifically, the determination may be performed using the conference ID embedded in the accessed URL or the like and the information in the conference ID column 705 of the reservation information table 700.

In step S808, a session token is issued. As described above, the session token is used to identify the user in the session. Here, for example, the session token management table 1000 is generated.

Figure 10:
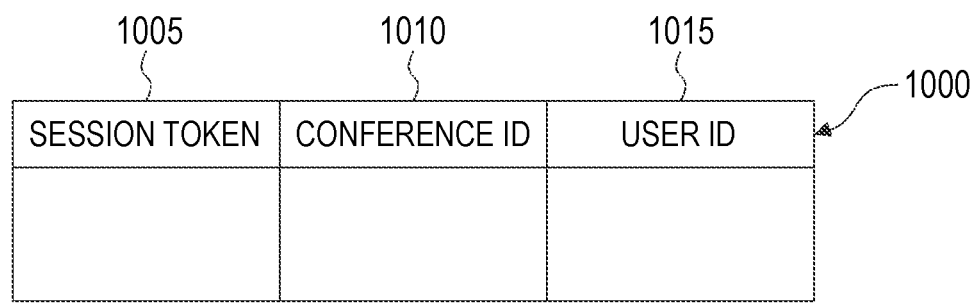
FIG. 10 is an explanatory diagram illustrating an example of a data structure of a session token management table.

FIG. 10 is an explanatory diagram illustrating an example of a data structure of the session token management table 1000.

The session token management table 1000 includes a session token column 1005, a conference ID column 1010, and a user ID column 1015. The session token column 1005 stores the session token issued in step S808. The conference ID column 1010 stores a conference ID corresponding to the session token. The user ID column 1015 stores a user ID corresponding to the session token.

In step S810, information of the business card image of the user that has logged in is embedded in the web UI content.

In step S812, a login record is stored in the storage DB service server 350.

In step S814, the content for the web UI is returned to the client together with the session token. As a result, the business card image is displayed on the terminal 210 of the participant.

In step S816, a response is made indicating an unauthorized participation time (for example, an error message indicating that the conference has not yet started, has already ended, or the like).

In step S818, a response is made indicating an authentication error (for example, an error message indicating a different password or the like).

Figure 11:
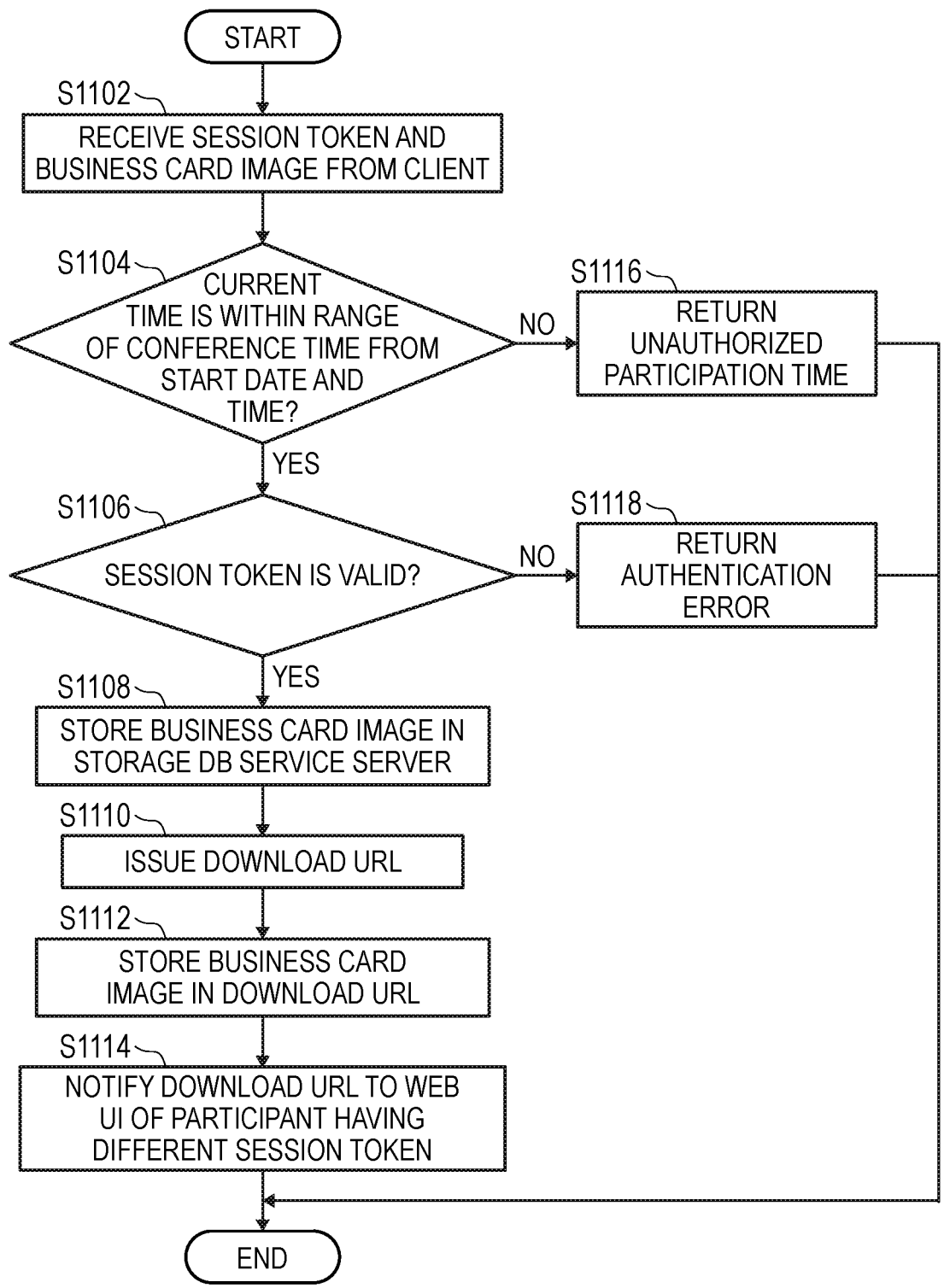
FIG. 11 is a flowchart illustrating a process example according to the present exemplary embodiment.

FIG. 11 is a flowchart illustrating a process example according to the present exemplary embodiment (business card exchange service server 300). FIG. 11 is a continuation of the flowchart illustrated in the example of FIG. 8, and illustrates a process example of the business card exchange service in the conference.

After receiving the notification of the business card image information, the web browser of the terminal 210 downloads the business card image and adds the business card image to the web UI.

In step S1102, the session token and the business card image are received from the client. Here, the "client" is the terminal 210 used by the online conference participant 320.

In step S1104, it is determined whether the current time is within the range of the conference time from the start date and time. If it is within the range of the conference time from the start date and time, the process proceeds to step S1106. Otherwise, the process proceeds to step S1116. Specifically, the determination may be performed using the current time and the information in the conference time column 715 of the reservation information table 700.

As described above, when the conference start date and time and the conference end date and time are input to the online business card exchange reservation screen 600, it may be determined whether the current time is within the range of the start date and time and the end date and time.

In step S1106, it is determined whether the session token is valid. If it is valid, the process proceeds to step S1108. Otherwise, the process proceeds to step S1118. More specifically, it is determined whether the session token received in step S1102 matches the value of the session token column 1005 of the session token management table 1000 (i.e. determined to be valid in case of matching).

In step S1108, the business card image received in step S1102 is stored in the storage DB service server 350.

In step S1110, a download URL is issued. The download URL is a URL for allowing another participant to download the business card image received in step S1102.

In step S1112, the business card image received in step S1102 is stored in the download URL issued in step S1110.

In step S1114, the download URL is notified to the web UI of a participant having a different session token. As a result, the participant may view the business card image of another participant.

In step S1116, a response is made indicating an unauthorized participation time (for example, an error message indicating that the conference has not yet started, has already ended, or the like).

In step S1118, a response is made indicating an authentication error (for example, an error message indicating a different session token or the like).

After the user is authenticated, display of the business card images of the participants of the conference, change of display positions of the business card images, enlarged display of the business card images, and download of the business card images are enabled on the web UI screen. Since the web UI screen is independent for each participant, the change of the display positions and the like do not affect display of other participants. By enabling the change of the display position of the business card image, as illustrated in an example of FIG. 13 to be described later, an arrangement of the business card images is changed in response to the display positions of the participants of the conference, and the same effect as that of a business card arrangement in the real conference (arranging business cards in accordance with seated positions of the participants) is obtained.

Further, by dragging and dropping the business card image or selecting a file on the web UI screen, it is possible to display the business card image of oneself to another participant. It is possible to distribute the business card image of oneself to the participant without requiring a procedure such as user registration.

Figure 12:
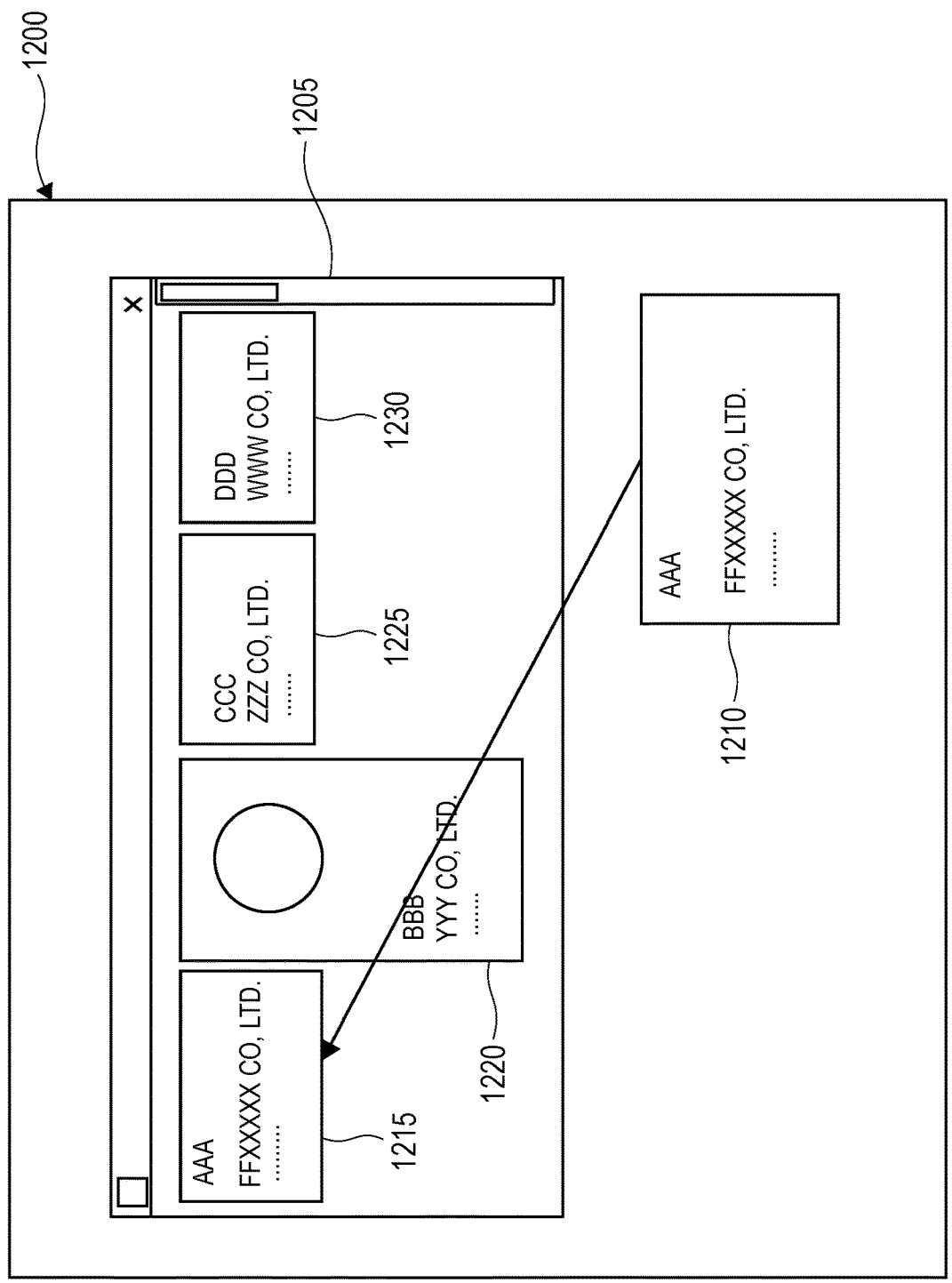
FIG. 12 is an explanatory diagram illustrating a display example according to the present exemplary embodiment.

FIG. 12 is an explanatory diagram illustrating the display example according to the present exemplary embodiment. FIG. 12 shows an example of a screen for business card exchange on the web UI screen of the terminal 210.

On a screen 1200, an online business card exchange screen 1205 (web UI screen), which is a screen of the web browser, is displayed.

The business card image 1210 is a business card image of oneself (specifically, the online conference participant 320 carrying the terminal 210 displaying the screen 1200), and is displayed on a screen 1200 which is a desktop screen or another application screen.

On the online business card exchange screen 1205, a business card image 1220, a business card image 1225, and a business card image 1230 of other participants of the conference are displayed. From this state, the online conference participant 320 operates the terminal 210 to copy the business card image 1210 to the online business card exchange screen 1205. In the example of FIG. 12, the copied business card image 1210 is a business card image 1215 in the online business card exchange screen 1205. Due to the copying operation, the process of step S1102 in the flowchart illustrated in the example of FIG. 11 is performed. Then, the business card image 1215 is displayed on the terminal 210 of the other online conference participants 320.

Conversely, the online conference participant 320 may operate the terminal 210 to copy the business card images of the other participants (the business card image 1220, the business card image 1225, and the business card image 1230) to the screen 1200, which is a desktop screen, or another application screen. Examples of other applications include a business card management service provided by the business card management service server 260.

The arrangement of the business card images on the online business card exchange screen 1205 may be changed in response to the operation of the online conference participant 320 with respect to the terminal 210. It is also possible to enlarge or reduce the business card images in response to the operation of the online conference participant 320 with respect to the terminal 210.

Figure 13:
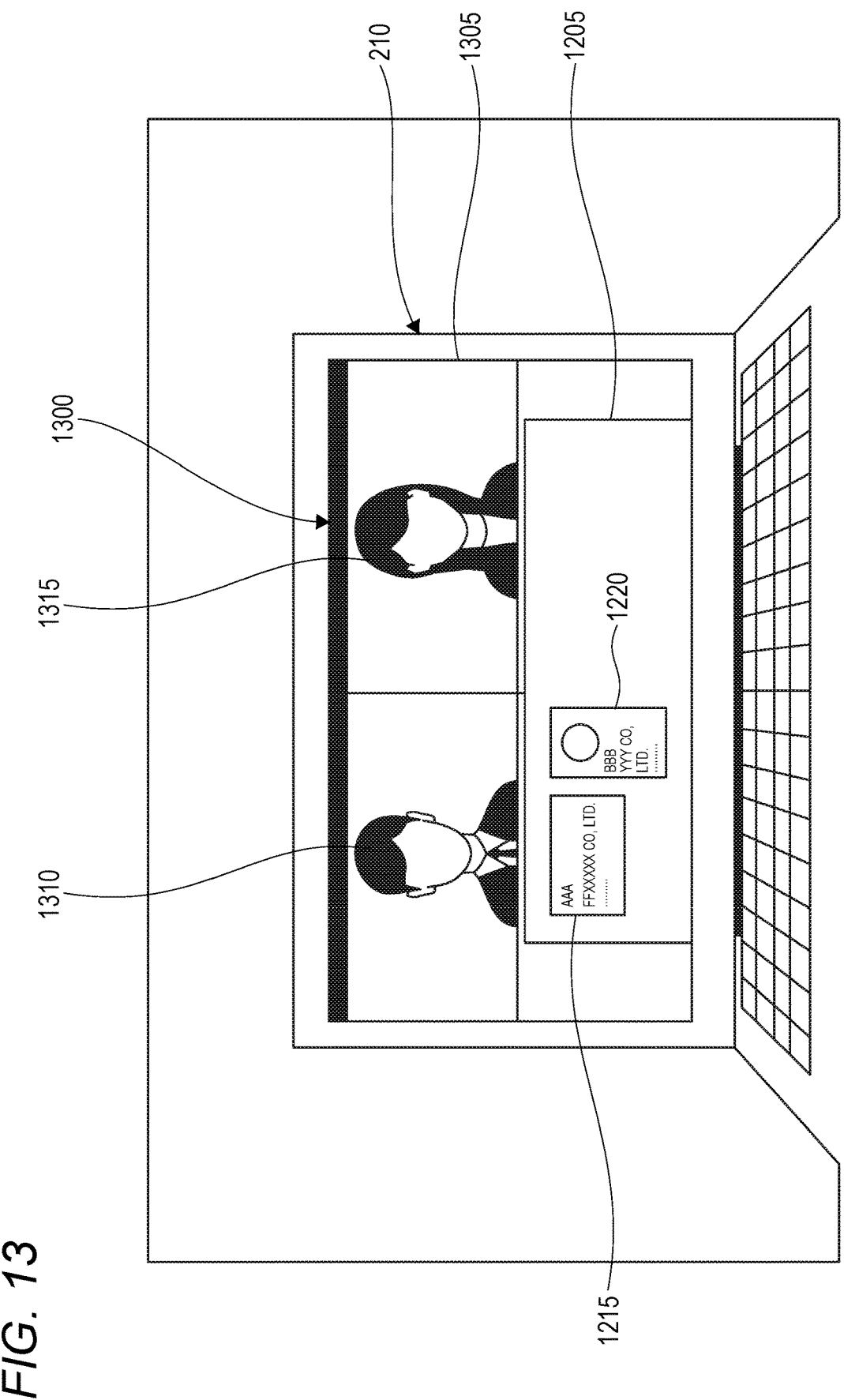
FIG. 13 is an explanatory diagram illustrating a display example according to the present exemplary embodiment.

FIG. 13 is an explanatory diagram illustrating the display example according to the present exemplary embodiment.

FIG. 13 shows an example in which a video conference screen 1305 and the online business card exchange screen 1205 are displayed on the screen 1300 of the terminal 210.

The video conference screen 1305 is a screen displayed by the online conference service server 240, and the online business card exchange screen 1205 is a screen displayed by the business card exchange service server 300. That is, the video conference screen 1305 and the online business card exchange screen 1205 are independent from each other.

The video conference screen 1305 displays captured images of a participant A1310 and a participant B1315.

The business card image 1215 and the business card image 1220 are displayed on the online business card exchange screen 1205. That is, the online conference participant 320 operates the terminal 210 to match the business card image on the online business card exchange screen 1205 to the display of the video conference screen 1305. Specifically, an example is illustrated in which the business card image 1215, which is the business card image of the participant A1310, is moved leftward, and the business card image 1220, which is the business card image of the participant B1315, is moved rightward. That is, the online business card exchange screen 1205 may be displayed simultaneously with the video conference screen 1305, and the arrangement of the business card images may be changed according to a display order of the participants.

Figure 14:
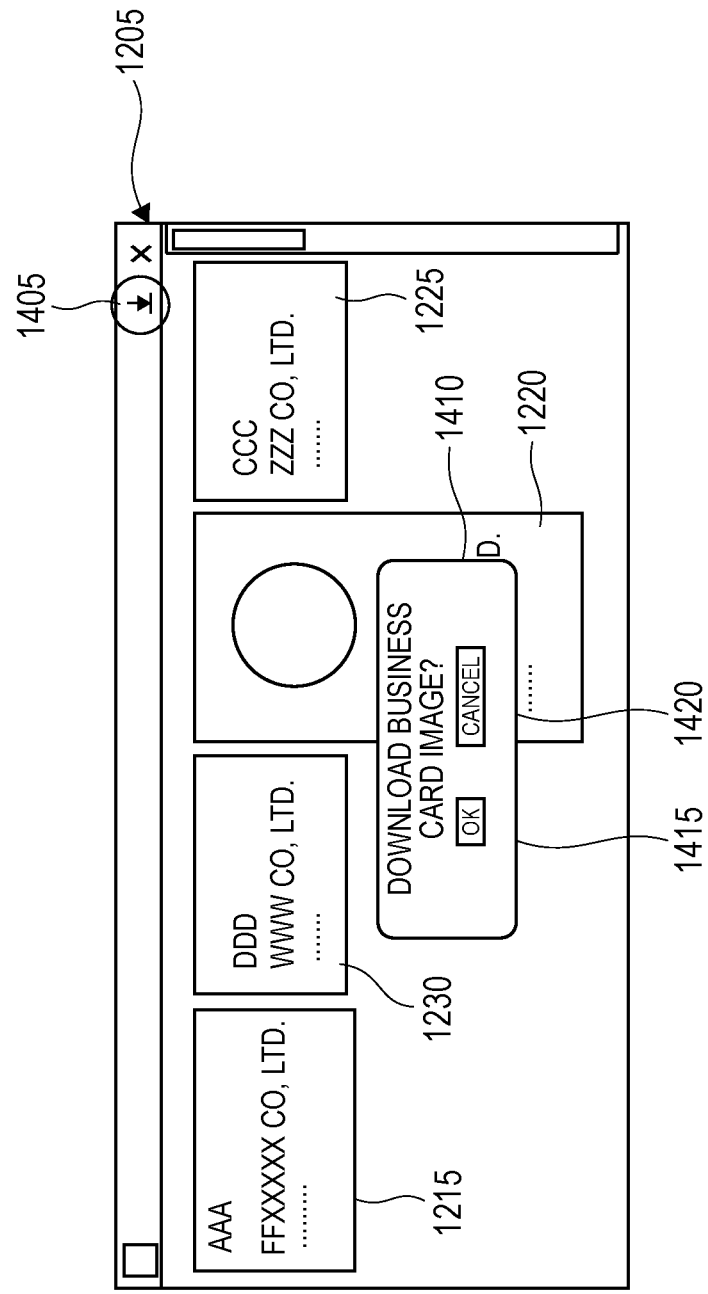
FIG. 14 is an explanatory diagram illustrating a display example according to the present exemplary embodiment.

FIG. 14 is an explanatory diagram illustrating the display example according to the present exemplary embodiment. FIG. 14 shows a process example of downloading a business card image.

On the online business card exchange screen 1205, a download button 1405 is displayed in addition to the business card image 1215, the business card image 1220, the business card image 1225, and the business card image 1230. (1) A business card image to be downloaded is selected by a click operation of the online conference participant 320. (2) It is detected that the download button 1405 is selected by the operation of the online conference participant 320. (3) A confirmation dialog display region 1410 is displayed. The confirmation dialog display region 1410 displays, for example, "Download business card image?", and displays an OK button 1415 and a cancel button 1420.

When it is detected that the OK button 1415 is selected in the confirmation dialog display region 1410, download of the business card image selected in (1) is started.

Figure 15:
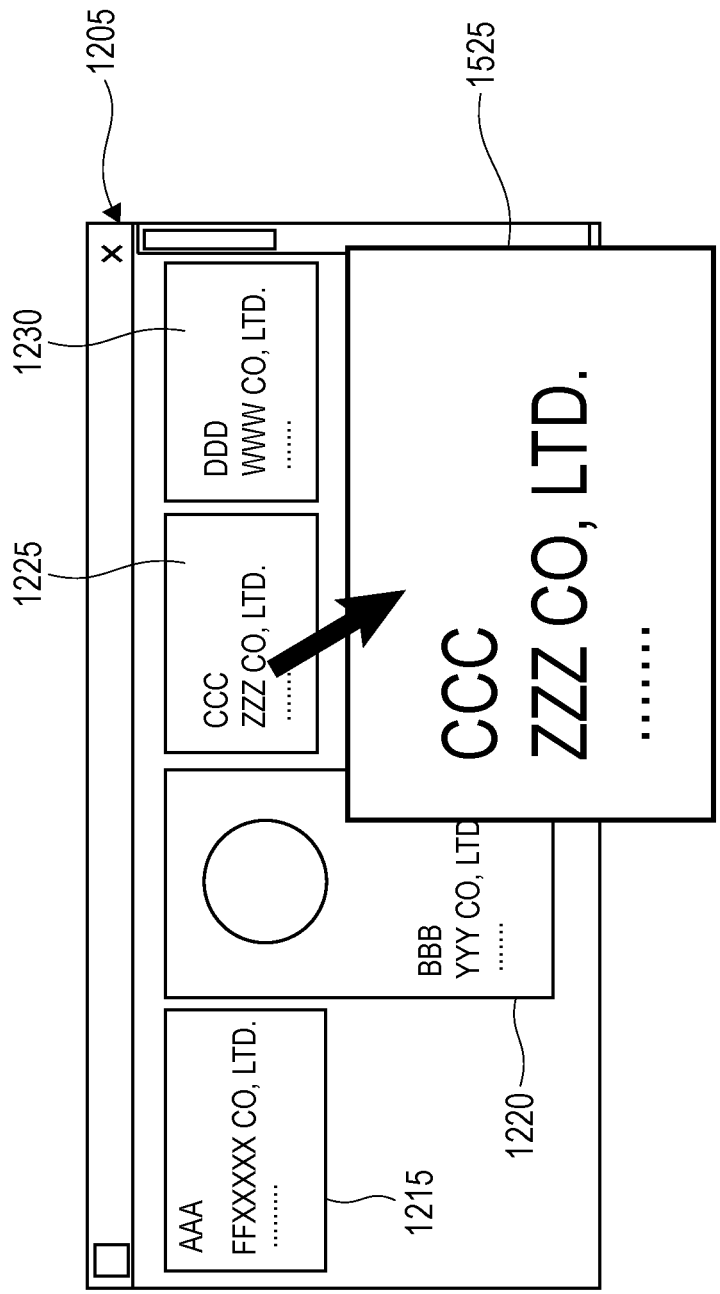
FIG. 15 is an explanatory diagram illustrating a display example according to the present exemplary embodiment.

FIG. 15 is an explanatory diagram illustrating the display example according to the present exemplary embodiment. FIG. 15 shows a process example of enlarged display of a business card image.

For example, when it is detected that the business card image 1225 in the online business card exchange screen 1205 is double-clicked by the online conference participant 320, an enlarged image of the business card image 1225 is displayed in an enlarged display region 1525.

The drawings from FIG. 16 to FIG. 28 show a process example in a case where a concept of group is applied to the participants of the conference. That is, since the participants belonging to the same group as oneself are already known, the business card images thereof may be handled differently from the business card images of a participant belonging to a different group.

Figure 16:
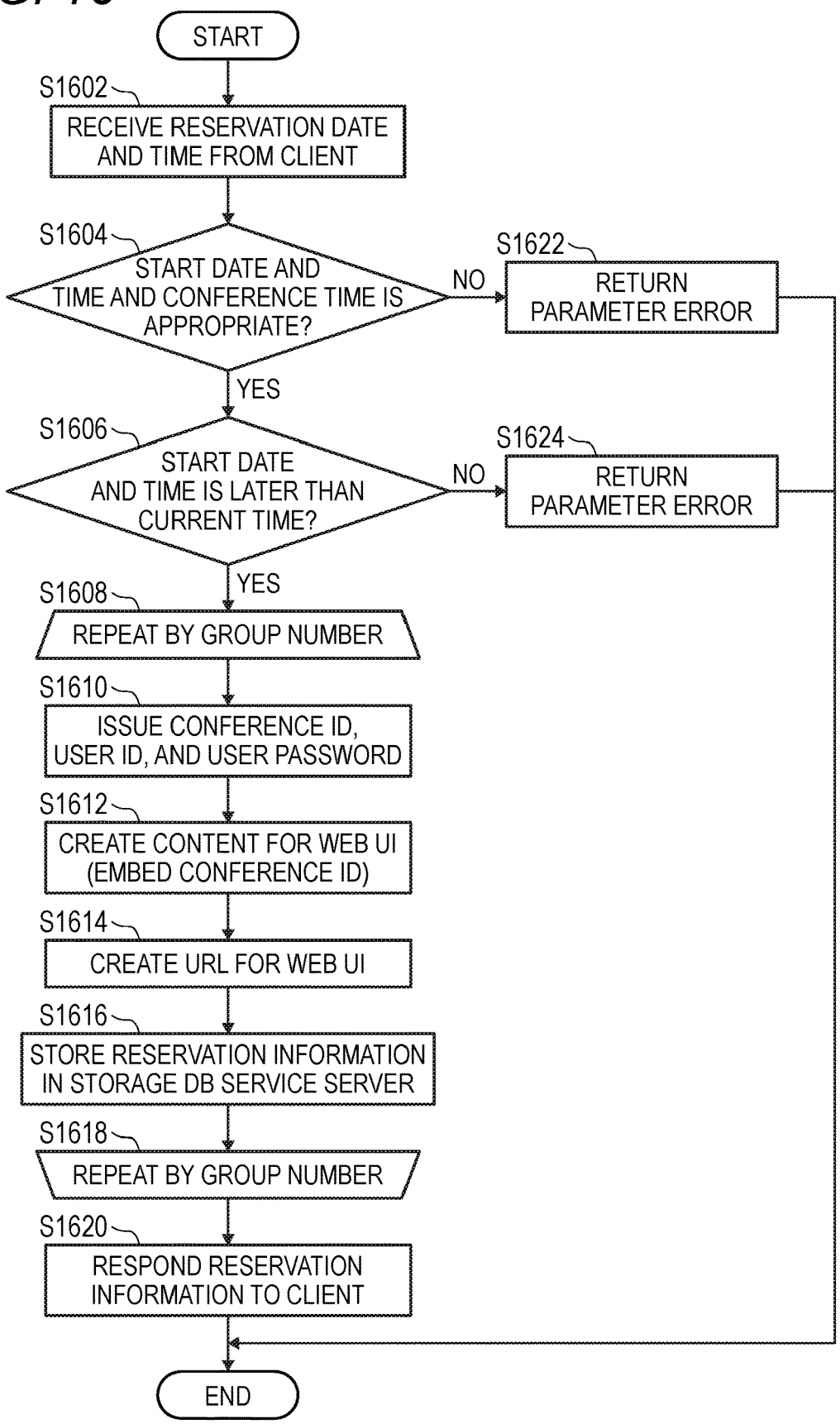
FIG. 16 is a flowchart illustrating a process example according to the present exemplary embodiment.

FIG. 16 is a flowchart illustrating a process example according to the present exemplary embodiment (business card exchange service server 300). FIG. 16 corresponds to the flowchart illustrated in the example of FIG. 5, and illustrates a process example related to the reservation of the business card exchange service. FIG. 16 is obtained by adding the process of step S1608 and step S1618 to the flowchart shown in the example of FIG. 5, in which the process from step S1610 to step S1616 is repeated by the number of groups. The other processing is the same as the process of the flowchart illustrated in the example of FIG. 5. In this process example, the user ID corresponds to a group ID.

In step S1602, a reservation date and time is received from a client. Here, the "client" is the terminal 210 used by the online conference organizer 322.

Figure 17:
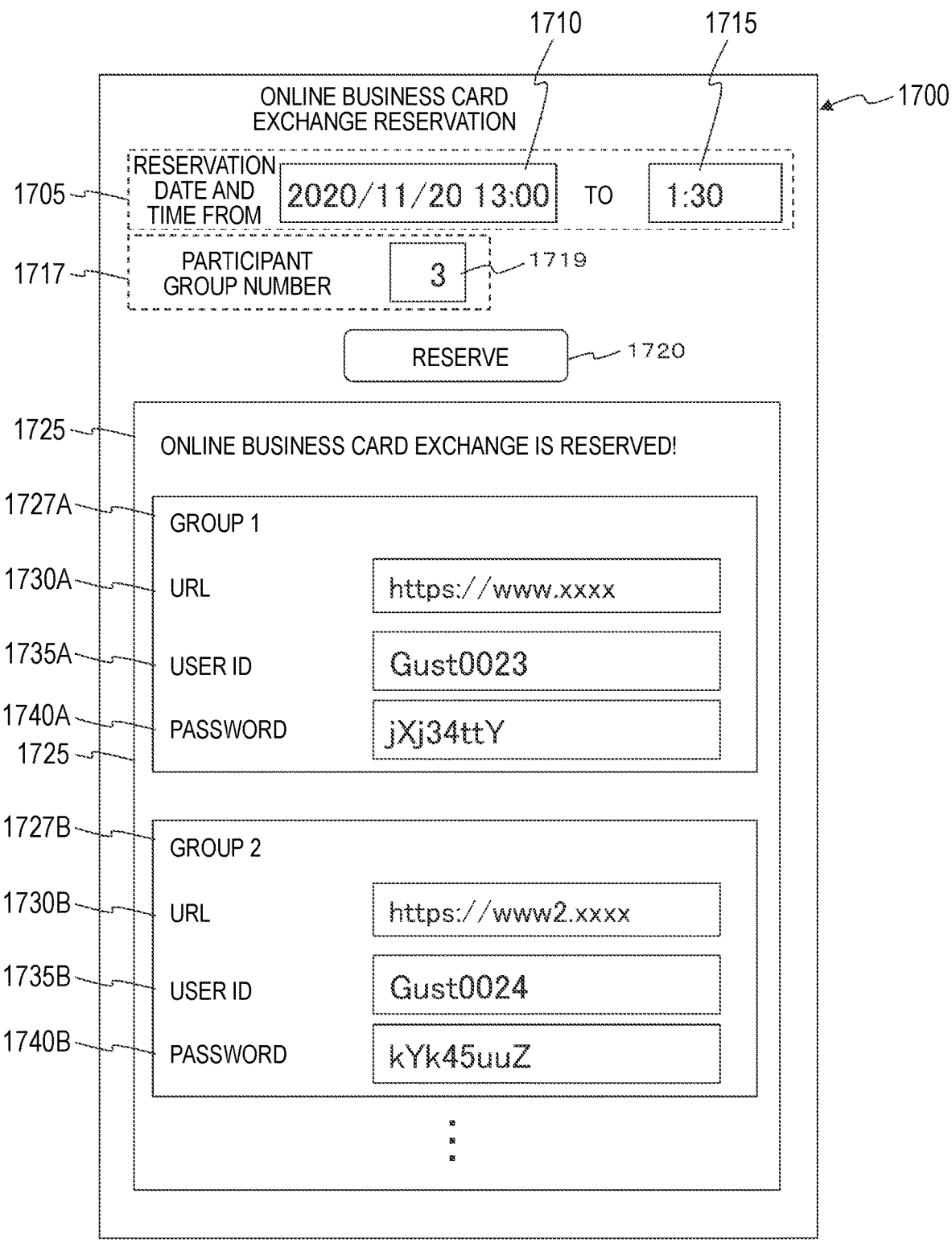
FIG. 17 is an explanatory diagram illustrating a display example according to the present exemplary embodiment.

For example, the business card exchange service server 300 causes the terminal 210 to display the online business card exchange reservation screen 1700 as illustrated in the example of FIG. 17.

FIG. 17 is an explanatory diagram illustrating the display example according to the present exemplary embodiment.

On the online business card exchange reservation screen 1700, a reservation date and time setting region 1705, a participant group number setting region 1717, a reservation button 1720, and a reservation information display region 1725 are displayed. The online business card exchange reservation screen 1700 corresponds to the online business card exchange reservation screen 600 illustrated in the example of FIG. 6, and is obtained by adding the participant group number setting region 1717 to the online business card exchange reservation screen 600, and displaying group X reservation information display regions 1727 by a designated group number.

The reservation date and time setting region 1705 includes a start date and time column 1710 and a conference time column 1715. The reservation date and time setting region 1705 is equivalent to the reservation date and time setting region 605 of the online business card exchange reservation screen 600 illustrated in the example of FIG. 6.

The participant group number setting region 1717 has a participant group number column 1719 for inputting the number of groups participating in the target conference. The online conference organizer 322 inputs values to the start date and time column 1710, the conference time column 1715, and the participant group number column 1719. When the reservation button 1720 is selected by the online conference organizer 322, the business card exchange service server 300 displays the inside of the reservation information display region 1725.

In the reservation information display region 1725, a group 1 reservation information display region 1727A, a group 2 reservation information display region 1727B, and the like are displayed. In the example of FIG. 17, since "3" is input to the participating group number column 1719, three group X reservation information display regions 1727 (group 1 reservation information display region 1727A, group 2 reservation information display region 1727B, group 3 reservation information display region 1727C) are displayed.

Each group X reservation information display region 1727 includes a URL column 1730, a user ID column 1735, and a password column 1740. The contents of the group X reservation information display regions 1727 are the same as the contents of the reservation information display region 625 of the online business card exchange reservation screen 600 shown in the example of FIG. 6.

In step S1604, it is determined whether the start date and time and the conference time are appropriate. If it is appropriate, the process proceeds to step S1606. Otherwise, the process proceeds to step S1622.

In step S1606, it is determined whether the start date and time is later than the current time. If it is later than the current time, the process proceeds to step S1608. Otherwise, the process proceeds to step S1624.

In step S1608, the process up to step S1616 is repeated by the number of groups.

In step S1610, the conference ID, the user ID, and the user password are issued.

In step S1612, the content for the web UI is created. The conference ID is embedded in the content.

In step S1614, the URL for the web UI is created.

In step S1616, the reservation information is stored in the storage DB service server 350.

In step S1618, the process of step S1610 to step S1616 is repeated by the number of groups, and the process proceeds to the next processing.

In step S1620, the reservation information is responded to the client. Specifically, the information in the reservation information display region 1725 of the online business card exchange reservation screen 1700 is displayed. After acquiring the reservation information, the online conference organizer 322 notifies the participants of the conference of the reservation information by using the mail 380 or the like. However, the contents to be notified (the contents of the URL column 1730, the user ID column 1735, and the password column 1740) are different for each group. That is, the content of the group 1 reservation information display region 1727A is notified to the group 1, the content of the group 2 reservation information display region 1727B is notified to the group 2, and the content of the group 3 reservation information display region 1727C is notified to the group 3.

In step S1622, a response is made indicating a parameter error.

In step S1624, a response is made indicating a parameter error.

Figure 18:
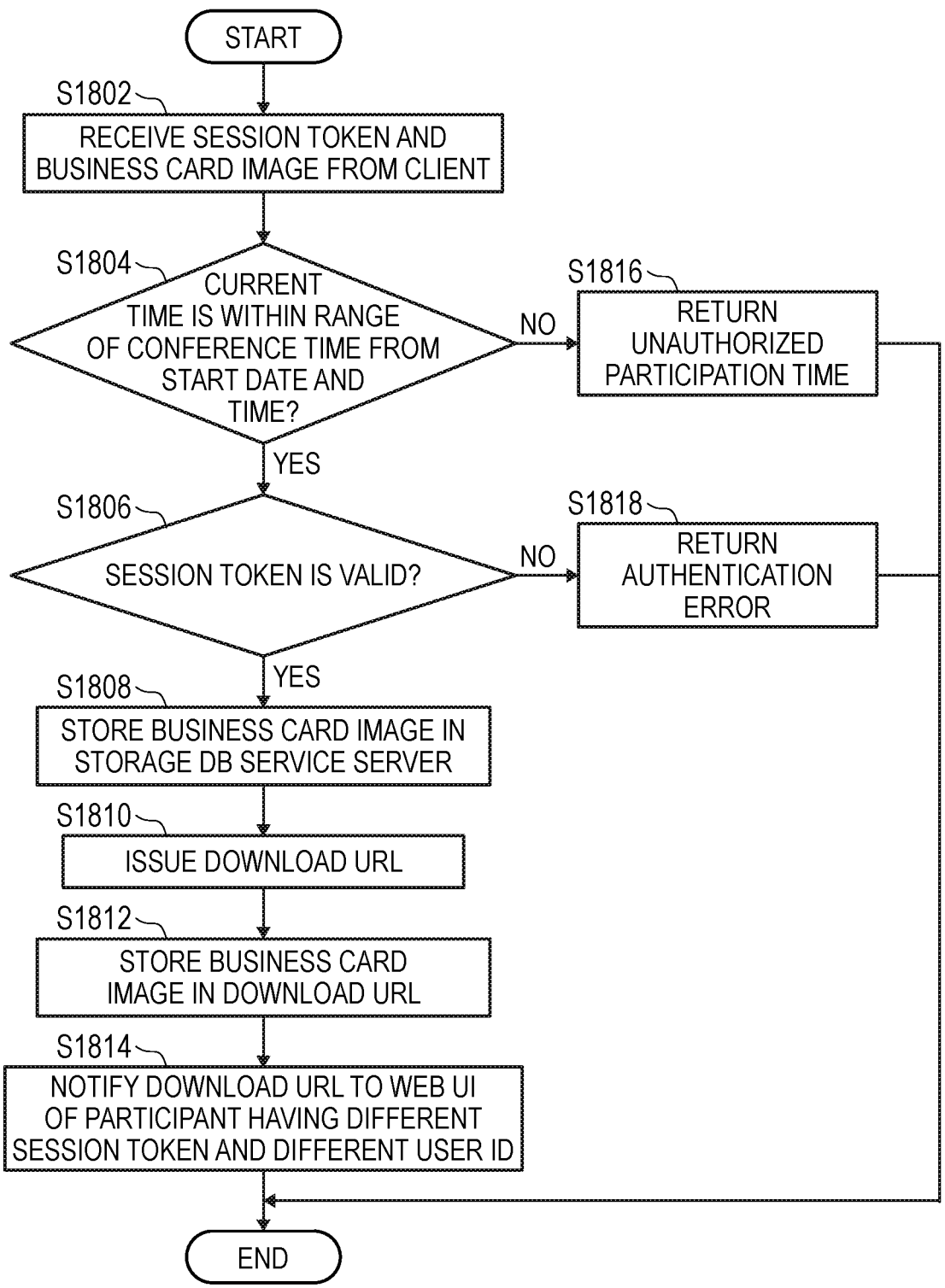
FIG. 18 is a flowchart illustrating a process example according to the present exemplary embodiment.

FIG. 18 is a flowchart illustrating a process example according to the present exemplary embodiment (business card exchange service server 300). FIG. 18 corresponds to the flowchart illustrated in the example of FIG. 11, and illustrates a process example of the business card exchange service in the conference. Step S1114 of the flowchart illustrated in the example of FIG. 11 is replaced with the process of step S1814, and the other processing is the same as the process in the flowchart illustrated in the example of FIG. 11. In the example of FIG. 18, the process is performed assuming that the user ID is equivalent to the group ID.

In step S1802, the session token and the business card image are received from the client.

In step S1804, it is determined whether the current time is within the range of the conference time from the start date and time. If it is within the range of the conference time from the start date and time, the process proceeds to step S1806. Otherwise, the process proceeds to step S1816.

In step S1806, it is determined whether the session token is valid. If it is valid, the process proceeds to step S1808. Otherwise, the process proceeds to step S1818.

In step S1808, the business card image is stored in the storage/DB service server 350.

In step S1810, a download URL is issued.

In step S1812, the business card image is stored in the download URL.

In step S1814, the download URL is notified to the web UI of a participant having a different session token and a different user ID. However, the download URL is not notified to the web UI of a participant having a different session token but having the same user ID. In this example, since the user ID substantially corresponds to the group ID, the above process is performed.

In step S1816, a response is made indicating an unauthorized participation time.

In step S1818, a response is made indicating an authentication error.

In the example of FIG. 16, it is assumed that the user ID is equivalent to the group ID, and the process from step 1610 to step S1616 is repeated by the number of groups. However, the process from step S1610 to step S1616 may be repeated by the number of participants in the target conference. In this case, instead of the flowchart illustrated in the example of FIG. 18, the process according to the flowchart illustrated in the example of FIG. 19 is performed.

Figure 19:
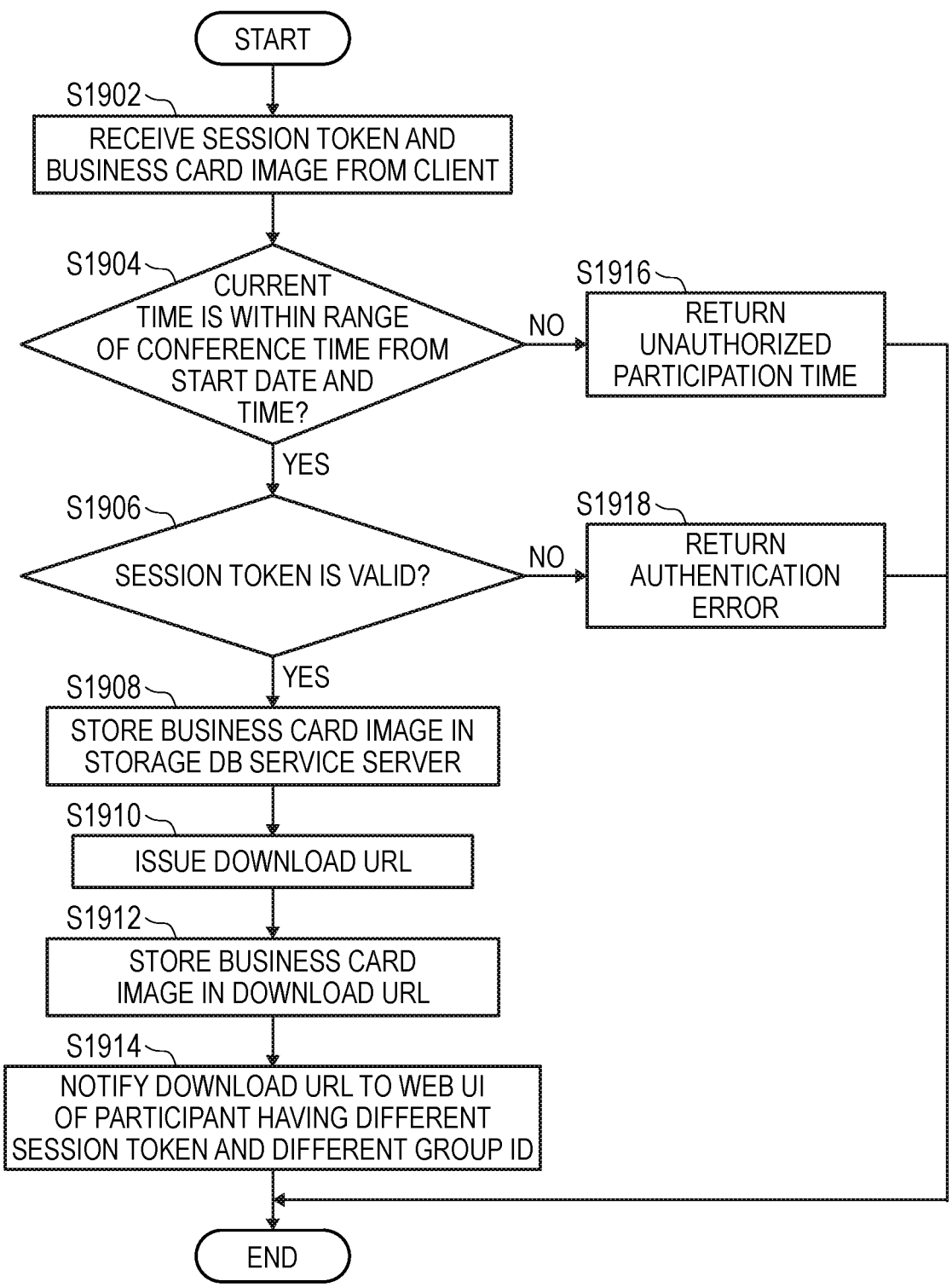
FIG. 19 is a flowchart illustrating a process example according to the present exemplary embodiment.

FIG. 19 is a flowchart illustrating a process example according to the present exemplary embodiment (business card exchange service server 300). Step S1814 of the flowchart illustrated in the example of FIG. 18 is replaced with the process of step S1914, and the other processing is the same as the process in the flowchart illustrated in the example of FIG. 18.

In step S1902, the session token and the business card image are received from the client.

In step S1904, it is determined whether the current time is within the range of the conference time from the start date and time. If it is within the range of the conference time from the start date and time, the process proceeds to step S1906. Otherwise, the process proceeds to step S1916.

In step S1906, it is determined whether the session token is valid. If it is valid, the process proceeds to step S1908. Otherwise, the process proceeds to step S1918.

In step S1908, the business card image is stored in the storage DB service server 350.

In step S1910, a download URL is issued.

In step S1912, the business card image is stored in the download URL.

In step S1914, the download URL is notified to the web UI of a participant having a different session token and belonging to a different group. However, the download URL is not notified to the web UI of a participant having a different session token but belonging to the same group.

In step S1916, a response is made indicating an unauthorized participation time.

In step S1918, a response is made indicating an authentication error.

In the process illustrated in the example of FIG. 19, for example, the group management table 2000 is used to manage the correspondence between the group ID and the user ID.

FIG. 20 is an explanatory diagram illustrating an example of a data structure of the group management table 2000.

The group management table 2000 includes a group ID column 2005, a user number column 2010, and a user ID column 2015. The group ID column 2005 stores information (specifically, group ID) for uniquely identifying the group in the exemplary embodiment. The user number column 2010 stores the number of users belonging to the group. The user ID column 2015 stores user IDs belonging to the group.

In step S1914, it may be determined whether a user having a different session token belongs to the same group as the user who has transmitted the business card image by extracting the user ID corresponding to the session token by using the session token management table 1000 and specifying the group ID corresponding to the extracted user ID by using the group management table 2000.

Figure 21:
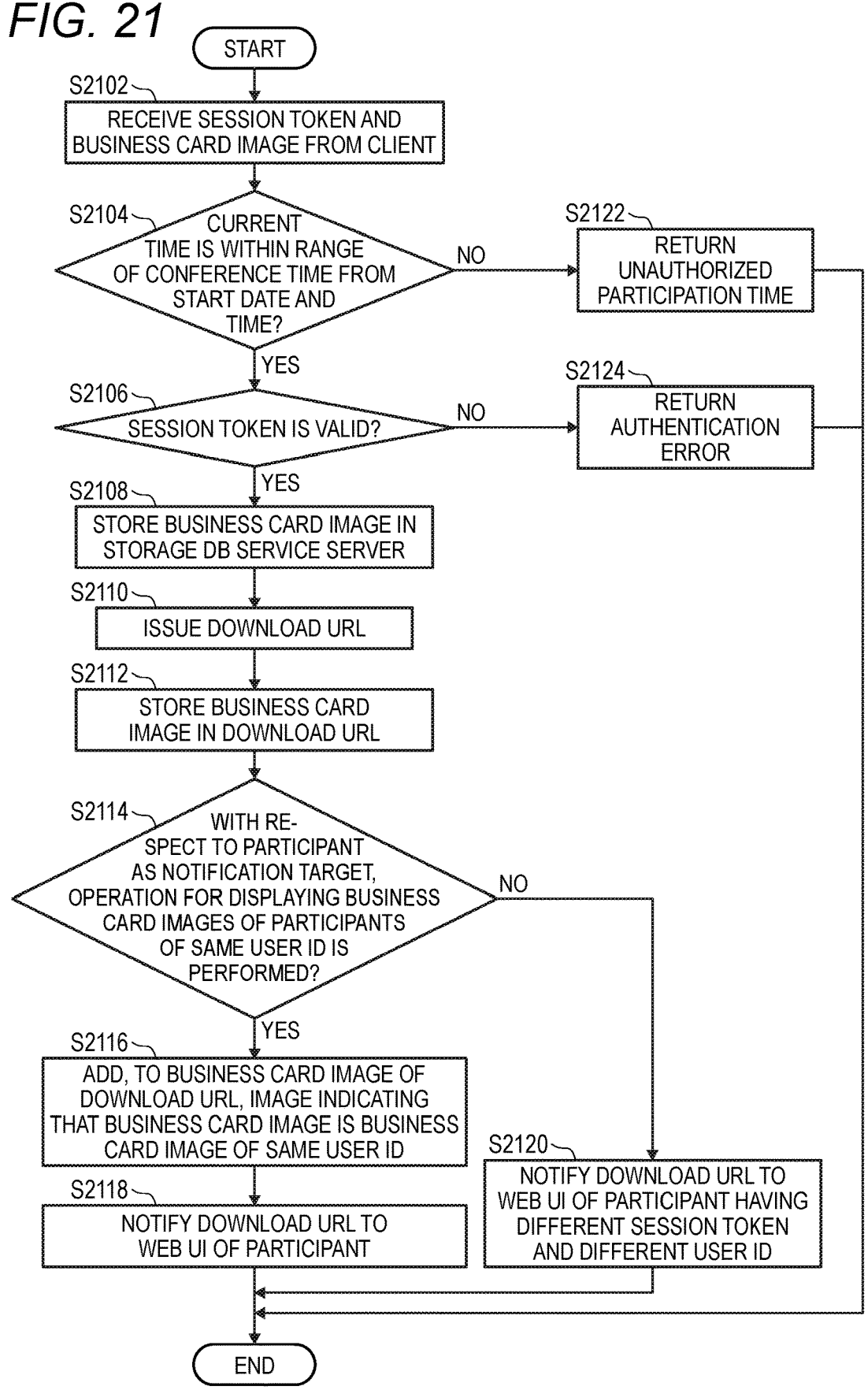
FIG. 21 is a flowchart illustrating a process example according to the present exemplary embodiment.

FIG. 21 is a flowchart illustrating a process example according to the present exemplary embodiment (business card exchange service server 300). FIG. 21 corresponds to the flowchart illustrated in the example of FIG. 11, and illustrates a process example of the business card exchange service in the conference. Step S1114 of the flowchart illustrated in the example of FIG. 11 is replaced with the process from step S2114 to step S2120, and the other processing is the same as the process in the flowchart illustrated in the example of FIG. 11. In the example of FIG. 21, the process is performed assuming that the user ID is equivalent to the group ID.

In step S2102, the session token and the business card image are received from the client.

In step S2104, it is determined whether the current time is within the range of the conference time from the start date and time. If it is within the range of the conference time from the start date and time, the process proceeds to step S2106. Otherwise, the process proceeds to step S2122.

In step S2106, it is determined whether the session token is valid. If it is valid, the process proceeds to step S2108. Otherwise, the process proceeds to step S2124.

In step S2108, the business card image is stored in the storage DB service server 350.

In step S2110, a download URL is issued.

In step S2112, the business card image is stored in the download URL.

In step S2114, with respect to the participant as the notification target, it is determined whether an operation for displaying the business card images of the participants of the same user ID has been performed. If it is determined to have been performed, the process proceeds to step S2116. Otherwise, the process proceeds to step S2120.

Figure 22:
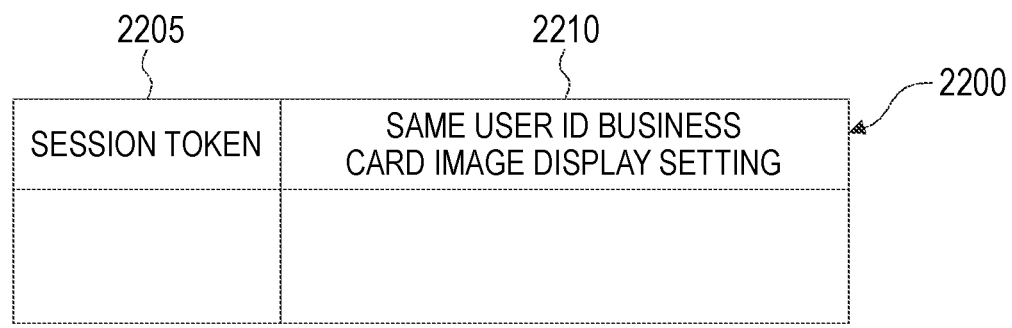
FIG. 22 is an explanatory diagram illustrating an example of a data structure of a business card image display setting table.

In order to perform the determination process in step S2114, for example, the business card image display setting table 2200 may be used. FIG. 22 is an explanatory diagram illustrating an example of a data structure of the business card image display setting table 2200.

The business card image display setting table 2200 includes a session token column 2205 and a same user ID business card image display setting column 2210. The session token column 2205 stores the session token. The same user ID business card image display setting column 2210 stores setting as to whether to display the business card images having the same user ID in the session token.

In step S2116, the business card image of the download URL is added with an image indicating that the business card image is a business card image of the same user ID.

In step S2118, the download URL is notified to the web UI of the participant. That is, the business card image is also transmitted to a participant having the same user ID (participant who has performed an operation for displaying the business card image of the participant of the same user ID), but the business card image is added with the image indicating that the business card image is the business card image of the same user ID. Of course, the original business card image is transmitted to a participant having a different user ID.

In step S2120, the download URL is notified to the web UI of a participant having a different session token and a different user ID. However, the download URL is not notified to the web UI of a participant having a different session token but having the same user ID. In this example, since the user ID substantially corresponds to the group ID, the above process is performed.

In step S2122, a response is made indicating an unauthorized participation time.

In step S2124, a response is made indicating an authentication error.

Figure 23:
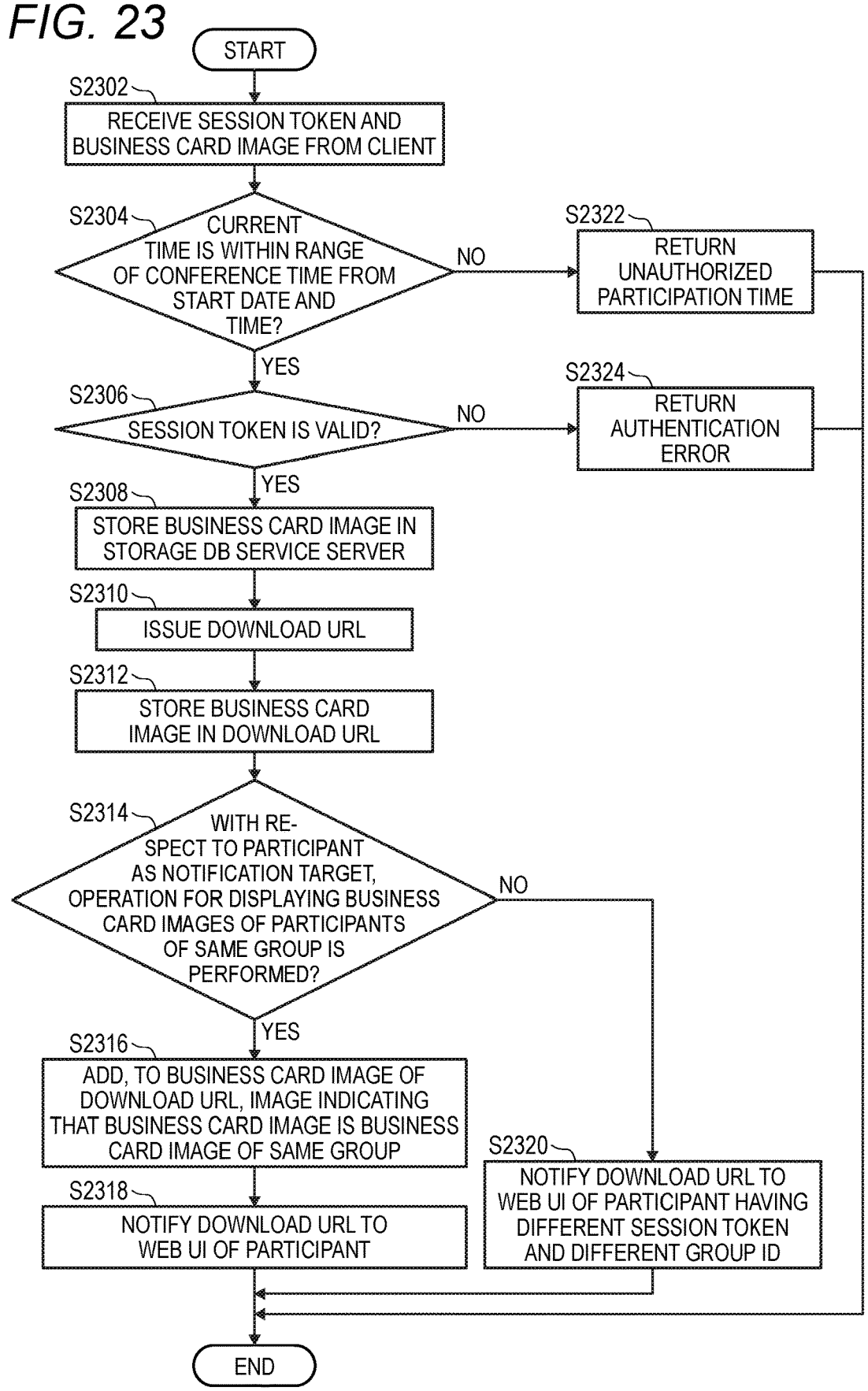
FIG. 23 is a flowchart illustrating a process example according to the present exemplary embodiment.

FIG. 23 is a flowchart illustrating a process example according to the present exemplary embodiment (business card exchange service server 300). FIG. 23 illustrates a process example of the business card exchange service in the conference, and illustrates a process example in a case where the user IDs are issued by the number of participants of the target conference. Step S2114 of the flowchart shown in the example of FIG. 21 is replaced with the process of step S2314, step S2116 is replaced with the process of step S2316, and step S2120 is replaced with the process of step S2320. The other processing is the same as the process in the flowchart illustrated in the example of FIG. 21.

In step S2302, the session token and the business card image are received from the client.

In step S2304, it is determined whether the current time is within the range of the conference time from the start date and time. If it is within the range of the conference time from the start date and time, the process proceeds to step S2306. Otherwise, the process proceeds to step S2322.

In step S2306, it is determined whether the session token is valid. If it is valid, the process proceeds to step S2308. Otherwise, the process proceeds to step S2324.

In step S2308, the business card image is stored in the storage DB service server 350.

In step S2310, a download URL is issued.

In step S2312, the business card image is stored in the download URL.

In step S2314, with respect to the participant as the notification target, it is determined whether an operation for displaying the business card images of the participants of the same group has been performed. If it is determined to have been performed, the process proceeds to step S2316. Otherwise, the process proceeds to step S2320.

Figure 24:
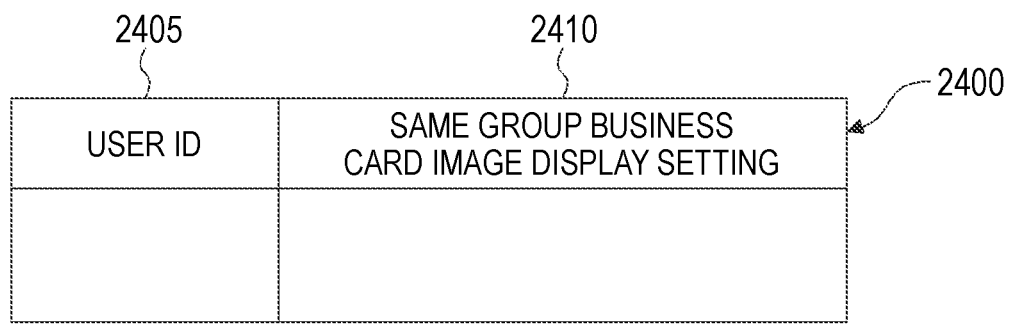
FIG. 24 is an explanatory diagram illustrating an example of a data structure of a business card image display setting table.

In order to perform the determination process in step S2314, for example, the business card image display setting table 2400 may be used. FIG. 24 is an explanatory diagram illustrating an example of a data structure of the business card image display setting table 2400. The business card image display setting table 2400 includes a user ID column 2405 and a same group business card image display setting column 2410. The user ID column 2405 stores a user ID. The same group business card image display setting column 2410 stores settings as to whether to display a business card image of a participant belonging to the same group in the user ID.

In step S2316, the business card image of the download URL is added with an image indicating that the business card image is a business card image of the same group.

In step S2318, the download URL is notified to the web UI of the participant. That is, the business card image is also transmitted to a participant having the same group (participant who has performed an operation for displaying the business card image of the participant of the same group), but the business card image is added with the image indicating that the business card image is the business card image of the same group. Of course, the original business card image is transmitted to a participant having a different group.

In step S2320, the download URL is notified to the web UI of a participant having a different session token and having a different group ID. However, the download URL is not notified to the web UI of a participant having a different session token but having the same group ID.

In step S2322, a response is made indicating an unauthorized participation time.

In step S2324, a response is made indicating an authentication error.

Figure 25:
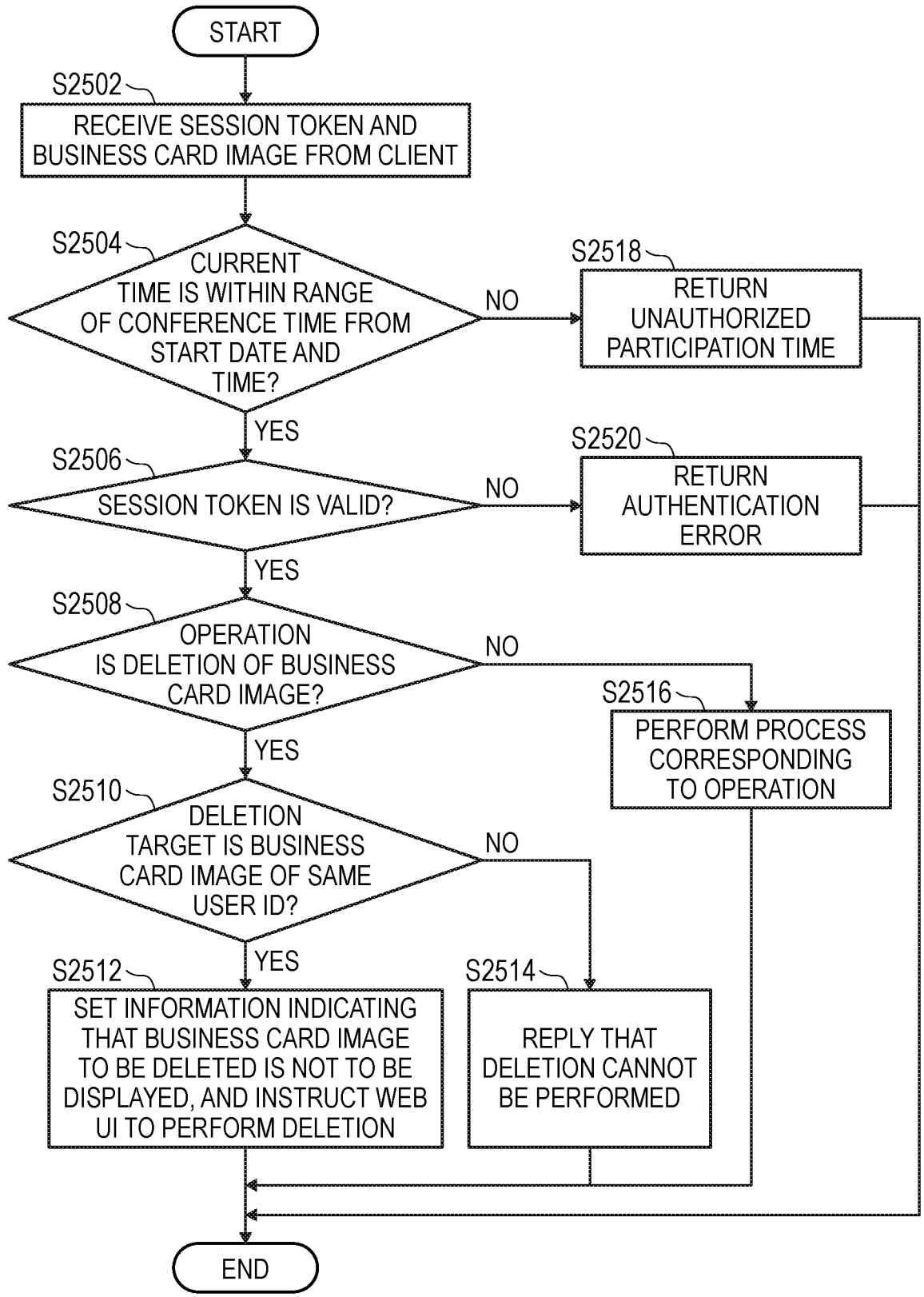
FIG. 25 is a flowchart illustrating a process example according to the present exemplary embodiment.

FIG. 25 is a flowchart illustrating a process example according to the present exemplary embodiment (business card exchange service server 300). FIG. 25 shows a process example performed when editing a business card image (for example, an operation of deleting display of a business card image). In the example of FIG. 25, the process is performed assuming that the user ID is equivalent to the group ID.

In step S2502, the session token and operation information are received from the client.

In step S2504, it is determined whether the current time is within the range of the conference time from the start date and time. If it is within the range of the conference time from the start date and time, the process proceeds to step S2506. Otherwise, the process proceeds to step S2518.

In step S2506, it is determined whether the session token is valid. If it is valid, the process proceeds to step S2508. Otherwise, the process proceeds to step S2520.

In step S2508, it is determined whether the operation is deletion of the business card image. If the operation is deletion of the business card image, the process proceeds to step S2510. Otherwise, the process proceeds to step S2516.

In step S2510, it is determined whether the deletion target is a business card image of the same user ID. In a case of a business card image of the same user ID, the process proceeds to step S2512. Otherwise, the process proceeds to step S2514.

If the setting is that the business card image of the same user ID is not to be displayed, the process always proceeds to step S2514.

Figure 26:
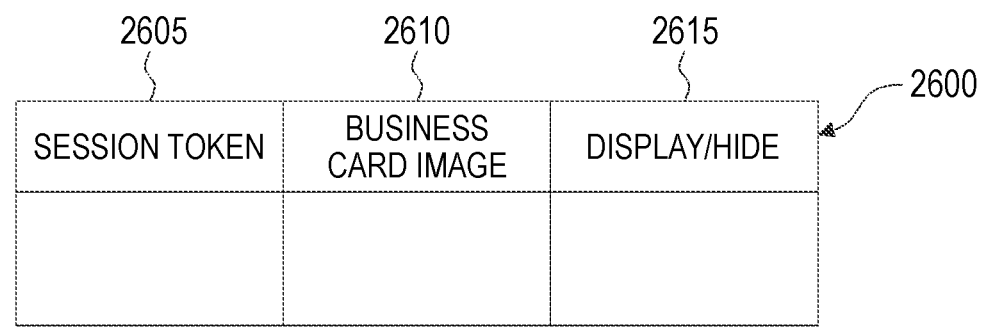
FIG. 26 is an explanatory diagram illustrating an example of a data structure of a business card image display/hide management table.

In step S2512, information indicating that the business card image to be deleted is not to be displayed is set, and deletion of the web UI is instructed. Then, for example, the business card image display/hide management table 2600 is used to manage which business card image is displayed in the session token. FIG. 26 is an explanatory diagram illustrating an example of a data structure of the business card image display/hide management table 2600.

The business card image display/hide management table 2600 includes a session token column 2605, a business card image column 2610, and a display/hide column 2615. The session token column 2605 stores the session token. The business card image column 2610 stores the business card image. The display/hide column 2615 stores information indicating whether the business card image is to be displayed or hidden in the session token. The business card image whose display is deleted is set to hidden.

If a business card image having the same user ID is set to hidden in the business card image display setting table 2200, the business card image is not to be deleted, and therefore, the process always proceeds to step S2514.

In step S2514, a response is made indicating deletion cannot be performed.

In step S2516, a process corresponding to the operation is performed.

In step S2518, a response is made indicating an unauthorized participation time.

In step S2520, a response is made indicating an authentication error.

Figure 27:
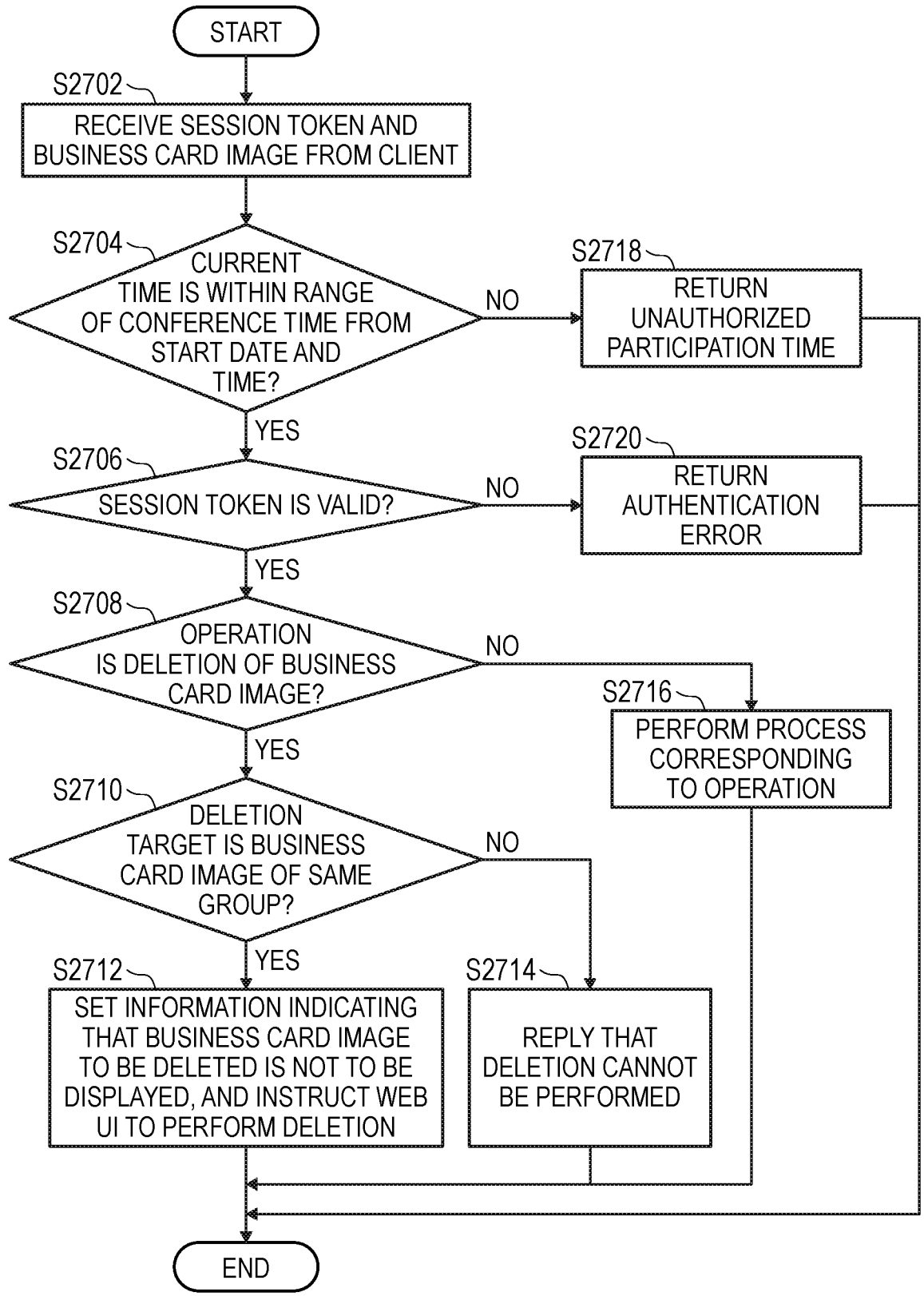
FIG. 27 is a flowchart illustrating a process example according to the present exemplary embodiment.

FIG. 27 is a flowchart illustrating a process example according to the present exemplary embodiment (business card exchange service server 300). FIG. 27 shows a process example performed when editing a business card image (for example, an operation of deleting display of a business card image), and illustrates a process example in a case where the user IDs are issued by the number of participants of the target conference. Step S2510 of the flowchart illustrated in the example of FIG. 25 is replaced with the process of step S2710, and the other processing is the same as the process in the flowchart illustrated in the example of FIG. 25.

In step S2702, the session token and operation information are received from the client.

In step S2704, it is determined whether the current time is within the range of the conference time from the start date and time. If it is within the range of the conference time from the start date and time, the process proceeds to step S2706. Otherwise, the process proceeds to step S2718.

In step S2706, it is determined whether the session token is valid. If it is valid, the process proceeds to step S2708. Otherwise, the process proceeds to step S2720.

In step S2708, it is determined whether the operation is deletion of the business card image. If the operation is deletion of the business card image, the process proceeds to step S2710. Otherwise, the process proceeds to step S2716.

Figure 28:
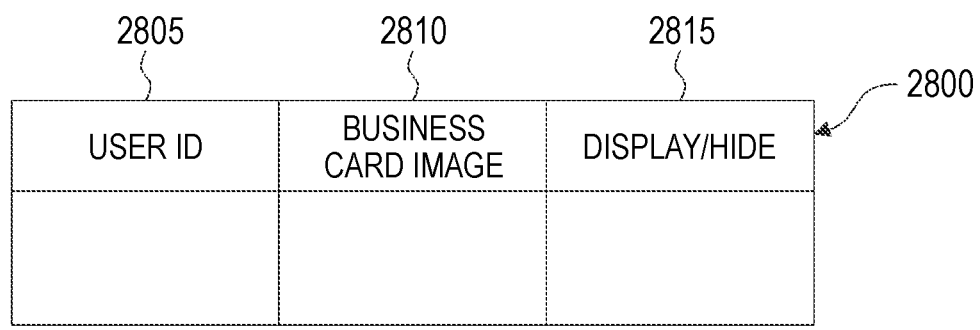
FIG. 28 is an explanatory diagram illustrating an example of a data structure of a business card image display/hide management table.

In step S2710, it is determined whether the deletion target is a business card image of the same group. If the deletion target is a business card image of the same group, the process proceeds to step S2712. Otherwise, the process proceeds to step S2714. Then, for example, the business card image display/hide management table 2800 is used to manage which business card image is displayed in the user. FIG. 28 is an explanatory diagram illustrating an example of a data structure of the business card image display/hide management table 2800.

The business card image display/hide management table 2800 includes a user ID column 2805, a business card image column 2810, and a display/hide column 2815. The user ID column 2805 stores the user ID. The business card image column 2810 stores the business card image. The display/hide column 2815 stores information indicating whether the business card image is to be displayed or hidden in the user. The business card image whose display is deleted is set to hidden.

If a business card image of a participant belonging to the same group is set to hidden in the business card image display setting table 2400, the business card image is not to be deleted, and therefore, the process always proceeds to step S2714.

In step S2712, information indicating that the business card image to be deleted is not to be displayed is set, and deletion of the web UI is instructed.

In step S2714, a response is made indicating that deletion cannot be performed.

In step S2716, a process corresponding to the operation is performed.

In step S2718, a response is made indicating an unauthorized participation time.

In step S2720, a response is made indicating an authentication error.

FIG. 29 is an explanatory diagram illustrating a process example in a case where the business card exchange service server 300 and the business card management service server 260 according to the present exemplary embodiment cooperate with each other. The business card exchange service server 300 and the business card management service server 260 are in authentication collaboration (federation) so that a so-called single sign-on is possible, and may transfer the business card image managed by the business card management service server 260 to the business card exchange service server 300, and conversely, may register the business card image acquired by the business card exchange service server 300 in the business card management service server 260.

The example illustrated in FIG. 29 shows a case where the business card exchange service server 300 cooperates with the business card management service by the business card management service server 260, and the online conference participants 320 include a user (registered user) of the business card management service.

In step S2902, the online conference participant 320 logs into the business card exchange service server 300 by using the terminal 210 with authentication information of the business card management service server 260. Specifically, in the online business card exchange login screen 900 illustrated in the example of FIG. 9, the user ID and the password of the business card management service of the business card management service server 260 are received.

The business card image of the online conference participant 320 is registered in the business card management service server 260, and it is not necessary to upload the business card image from the web UI of the terminal 210 to the business card exchange service server 300.

In step S2904, the business card exchange service server 300 sends the authentication information of the online conference participant 320 to the business card management service server 260.

In step S2906, the business card management service server 260 authenticates the authentication information of the online conference participant 320, and if the authentication is successful, transmits a business card image 2950A of the online conference participant 320 to the business card exchange service server 300. As described above, by the cooperation between the business card exchange service server 300 and the business card management service server 260, the online conference participant 320 does not need to download his/her business card image 2950C from the business card management service server 260, and does not need to upload his/her business card image 2950C to the business card exchange service server 300.

In step S2908, the business card exchange service server 300 transmits a business card image 2950B of another online conference participant 320 for registration to the business card management service server 260. Here, the "business card image 2950B of another online conference participant 320" refers to a business card image in a case where a participant of the conference acquires a business card image of a participant other than the himself/herself. The business card management service server 260 registers the received business card image 2950B.

Specifically, the online conference participant 320A1 is a registered user of the business card management service server 260. In this case, when the business card image of the online conference participant 320A2 is displayed on the web UI of the business card exchange service of the terminal 210 of the online conference participant 320A1, the business card exchange service server 300 registers the business card image of the online conference participant 320A2 in the business card management service server 260. Thereafter, the online conference participant 320A1 is allowed to search for the business card image of the online conference participant 320A2 by the business card management service server 260.

When the business card exchange service server 300 and the business card management service server 260 cooperate with each other, it is possible to start the web UI of the business card exchange service with the ID and the password of the business card management service, and instead of uploading the business card image, it is possible to display the business card image of the participant in the business card management service to the participant himself/herself, and to automatically register the business card images of the other participants in the business card management service. For the participant, there is no need to upload or download the business card image, and registration to the business card management service is also automatically performed.

In the exemplary embodiments above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The program described above may be provided by being stored in a recording medium, or may be provided by a communication unit. In this case, for example, the above-described program may be regarded as an invention of a "computer-readable recording medium storing a program".

The "computer-readable recording medium storing a program" refers to a computer-readable recording medium in which a program is recorded, which is used for program installation, execution, program distribution, or the like.

The recording medium includes, for example, a digital versatile disc (DVD) such as a "DVD-R, DVD-RW, DVD-RAM, or the like" that is a standard established by the DVD Forum, "DVD+R, DVD+RW, or the like" that is a standard established by DVD+RW, a compact disk (CD) including read-only memory (CD-ROM), CD recordable (CD-R), CD rewritable (CD-RW), or the like, and a Blu-ray (registered trademark) disc, a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), a secure digital (SD) memory card, or the like.

The whole or a part of the program may be recorded in the recording medium and stored, distributed, or the like. In addition, the program may be transmitted by communication, for example, by using a transmission medium such as a wired network or a wireless communication network used for a local area network (LAN), a metropolitan area network (MAN), a wide area network (WAN), the Internet, an intranet, extranet, or the like, or a combination thereof, or may be carried on a carrier wave.

Further, the program may be a part or the whole of another program, or may be recorded on a recording medium together with a separate program. In addition, the program may be divided and recorded on plural recording media. In addition, the program may be recorded in any form as long as the program is restorable, such as in a compressed form, in an encrypted form, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising
   a processor configured to:
      allow, in relation to a conference via a communication line in which a plurality of participants participate, a plurality of business card images to be displayable on a terminal of a first participant, belonging to a first group, among the plurality of participants, the plurality of business card images being obtained by reading business cards of the plurality of participants;
      perform control so as not to display on the terminal first business card images of the participants of the conference belonging to the first group; and
      perform control so as to display on the terminal only one or more second business card images of the participants of the conference not belonging to the first group.

2. The information processing apparatus according to claim 1, wherein
the processor is further configured to
display one of the first business card images on the terminal in response to an operation of the first participant; and
perform control such that, in response to a deletion operation by the first participant, the one of the first business card images is deleted from a screen of the terminal and such that the one or more second business card images are not deleted.

3. The information processing device according to claim 1, wherein
the processor is further configured to
perform control such that, in a case where one of the first business card images and the one or more second business card images are displayed together, the one of the first business card images and the one or more second business card images are displayed in a distinguishable manner from each other.

4. The information processing device according to claim 1, wherein
the processor is further configured to
allow, in response to a URL being accessed from the terminal of the participant, a business card image already stored in the URL to be displayed on the terminal; and
allow, in response to the business card image being stored to the URL from the terminal of the participant, the business card image to be displayed on terminals of the other participants.

5. The information processing device according to claim 4, wherein
the processor is further configured to
generate the URL, a participant ID, and a password for the first group before a start of the conference, the URL, the participant ID, and the password being common to the first group; and
perform control so as not to display on the terminal the first business card image stored by a participant of the participant ID that is common to the first group.

6. The information processing device according to claim 4, wherein
the processor is further configured to
generate the URL, a participant ID, and a password for the first group before a start of the conference, the URL, the participant ID, and the password being common to the first group; and
perform control so as to display on the terminal only the one or more second business card images stored by one or more participants of a different participant ID common to a different group.

7. The information processing device according to claim 1, wherein
the processor is further configured to
acquire, in cooperation with a business card management service, another business card image of a participant from the business card management service; and
allow the other business card image to be displayed on a terminal of another participant.

8. The information processing device according to claim 6, wherein
the processor is further configured to
register, in response to a business card image of the first participant being stored from the terminal of the other participant, the business card image of the first participant in the business card management service.

9. A non-transitory computer readable medium storing a program for causing a computer to execute a process for information processing, the process comprising:
allowing, in relation to a conference via a communication line in which a plurality of participants participate, a plurality of business card images to be displayable on a terminal of a first participant, belonging to a first group, among the plurality of participants, the plurality of business card images being obtained by reading business cards of the plurality of participants;
performing control so as not to display on the terminal first business card images of the participants of the conference belonging to the first group; and
performing control so as to display on the terminal only one or more second business card images of the participants of the conference not belonging to the first group.

* * * * *